US010116227B2

United States Patent
Pu et al.

(10) Patent No.: US 10,116,227 B2
(45) Date of Patent: Oct. 30, 2018

(54) SYSTEM AND METHOD FOR PULSE DRIVING FOR REDUCING NUMBER OF OPTICAL FIBERS

(71) Applicant: DELTA ELECTRONICS (SHANGHAI) CO., LTD, Shanghai (CN)

(72) Inventors: Boyu Pu, Shanghai (CN); Yi Zhang, Shanghai (CN); Zheng Wang, Shanghai (CN); Zhao Wang, Shanghai (CN); Hailong Wang, Shanghai (CN); Ming Wang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 124 days.

(21) Appl. No.: 15/263,979

(22) Filed: Sep. 13, 2016

(65) Prior Publication Data
US 2017/0149344 A1 May 25, 2017

(30) Foreign Application Priority Data
Nov. 20, 2015 (CN) .......................... 2015 1 0812968

(51) Int. Cl.
*H02M 7/155* (2006.01)
*H02M 5/458* (2006.01)
(Continued)

(52) U.S. Cl.
CPC ............. *H02M 5/458* (2013.01); *H02M 1/08* (2013.01); *H02M 2001/0009* (2013.01)

(58) Field of Classification Search
CPC .................................................... H02M 7/155
(Continued)

(56) References Cited

U.S. PATENT DOCUMENTS 6,850,426 B2 * 2/2005 Kojori ................. H02P 23/0004
363/123
8,760,144 B2 * 6/2014 Wang ................... H03K 5/2481
323/285

(Continued)

FOREIGN PATENT DOCUMENTS

CN 103036461 A 4/2013
CN 104052248 A 9/2014

OTHER PUBLICATIONS

1st Office Action dated Sep. 5, 2018 by the CN Office.

*Primary Examiner* — Adolf Berhane
*Assistant Examiner* — Nusrat Quddus
(74) *Attorney, Agent, or Firm* — Yunling Ren

(57) ABSTRACT

The present disclosure relates to a system and method for pulse driving. The system is configured to drive a multi-level converter, including: a main control module generating encoding information which contains driving information according to sampling information; a local control module electrically coupled to the multi-level converter to output control signals to the multi-level converter so as to control on and off of the at least M power switches in the multi-level converter; a first optical fiber coupled to the main control module and the local control module, wherein the local control module receives the encoding information output from the main control module via the first optical fiber and generates the control signals according to the encoding information.

23 Claims, 18 Drawing Sheets

(51) Int. Cl.
*H02M 1/08* (2006.01)
*H02M 1/00* (2006.01)

(58) Field of Classification Search
USPC ...... 363/15, 17, 21.02–21.18, 44–48, 52–53,
363/37, 123, 125–127, 80, 81, 84
See application file for complete search history.

(56) References Cited

U.S. PATENT DOCUMENTS

| | | | |
|---|---|---|---|
| 8,971,068 B2* | 3/2015 | Pu | H02M 1/126 363/44 |
| 2003/0204777 A1 | 10/2003 | Kojori | |
| 2013/0076293 A1* | 3/2013 | Chen | H02J 3/01 318/729 |
| 2014/0268938 A1* | 9/2014 | Matthews | H02M 1/32 363/50 |
| 2015/0381029 A1* | 12/2015 | Gan | H03K 17/082 363/53 |
| 2016/0111961 A1* | 4/2016 | Balakrishnan | H02M 3/33507 363/21.12 |

\* cited by examiner

SYSTEM AND METHOD FOR PULSE DRIVING FOR REDUCING NUMBER OF OPTICAL FIBERS

CROSS-REFERENCE TO RELATED APPLICATIONS

This application claims priority to Chinese Patent Application No. 201510812968.9, filed Nov. 20, 2015, the entire contents of which are incorporated herein by reference.

TECHNICAL FIELD

The present disclosure generally relates to power conversion technologies, and more particularly, to a system and method for pulse driving.

BACKGROUND

In high power conversion field, a main control unit and a power module are isolated with each other by an optical fiber and a high voltage isolation power supply. For each power switch, the main control unit transmits a corresponding Pulse Width Modulation (PWM) signal to a gate driver circuit for the switch via an optical fiber. Meanwhile, the gate driver circuit sends a protection signal for the power switch to a low voltage control side via an optical fiber.

FIG. 1 is a schematic diagram showing a structure of a driving system for one phase (for example, Phase A) in a PWM Neutral Point Clamped (NPC) three-level converter. The system includes two main parts, i.e., a main control unit 11 and a power module 12. The main control unit 11, as the core control part of the system, is generally responsible for sampling of information such as system voltages and currents, implementation of control algorithms, generation of system timing, and generation of PWM switching signals. Usually, these functions can be realized by digital control chips which may be composed of one or a combination of a Digital Signal Processor (DSP), a Programmable Logic Controller (PLC), a Single Chip Microcomputer and even a Field-Programmable Gate Array (FPGA)/a Complex Programmable Logic Device (CPLD). The power module 12, as an executing mechanism in the system, is generally responsible for receiving the PWM switching signals transmitted from the main control unit 11, generation of corresponding switching actions, and power and energy conversion. In high power conversion field, when performing switching actions, the power module 12 usually generates large voltage jumps, thereby resulting in common-mode current interference. In order to prevent such interference from influencing the main control unit 11, isolations generated by magnetic cores or light are provided between the main control unit 11 and the power module 12. As shown in FIG. 1, magnetic isolation drivers for $S_1$-$S_4$ are used to achieve the isolation between the power module 12 and the main control unit 11. Also, respective ones of power switches in the power module 12 correspond to the isolation drivers one to one. For example, by the magnetic isolation driver 131 corresponding to S1, the magnetic isolation driver 132 corresponding to S2, the magnetic isolation driver 133 corresponding to S3, the magnetic isolation driver 134 corresponding to S4, the gate drivers of the power switches $S_1$, $S_2$, $S_3$, and $S_4$ in the power module 12 are isolated from each other without interference therebetween. Further, because the current flowing through the power module 12 is relatively large, and the power module 12 withstands relatively high voltage, it is needed to generate safe isolation between the power module 12 and the main control unit 11. Because of properties such as strong anti-interference capability and high insulation voltage, optical fibers are widely applied in the high power conversion field. Referring to FIG. 1, the DSP in the main control unit 11 transmits signals to respective magnetic isolation drivers via two optical fibers. For example, the main control unit 11 transmits PWM switching signals to the magnetic isolation driver 131 corresponding to S1 by a sending optical fiber Fiber1, and receives a failure protection signal for the power switch $S_1$ via a receiving optical fiber Fiber2. Thus, a power module including four power switches need 4*2=8 optical fibers. For a three-phase NPC converter, a total of 8*3=24 optical fibers are needed. That is, if the conventional driving method for two-level or three-level converters is simply applied into a five-level, seven-level, or even nine-level converter, the number of needed optical fibers will rise greatly, and the driver circuit will become complicated.

With the development in the high power conversion field, increase of the number of levels in a converter can effectively improve electrical property of the converter. However, the increase of the number of levels will result in rise in number of the power switches, and a follow-on problem is that the needed sending and receiving optical fibers are increased. The increase in the number of optical fibers will increase costs, and system reliability will be greatly reduced due to high failure rate of the optical fibers.

SUMMARY

Aiming at the defects existing in conventional technologies, embodiments of the present disclosure provide a system and method for pulse driving which are capable of addressing the problem of increased costs and reduction in system reliability due to increase in number of needed optical fibers as the number of levels rises.

The technical solutions of the present disclosure are as follows.

According to a first aspect of embodiments of the present disclosure, there is provided a pulse driving system for driving a multi-level converter which includes at least M power switches, where M≥2, wherein the pulse driving system includes:

a main control module generating encoding information which contains driving information according to sampling information;

a local control module electrically coupled to the multi-level converter to output control signals to the multi-level converter so as to control on and off of the at least M power switches in the multi-level converter;

a first optical fiber coupled to the main control module and the local control module, wherein the local control module receives the encoding information output from the main control module via the first optical fiber and generates the control signals according to the encoding information.

According to another aspect of embodiments of the present disclosure, there is provided a pulse driving method for driving a multi-level converter which includes at least M power switches, where M≥2, wherein the method includes:

receiving sampling information of the multi-level converter, and generating encoding information which contains driving information according to the sampling information;

receiving the encoding information via a first optical fiber, and generating a control signal according to the encoding information; and controlling on and off of the at least M power switches in the multi-lever converter according to the control signal.

As can be seen from the above technical solutions, the present disclosure has the following advantageous effects:

The structure of conventional PWM driving system is changed, i.e., a local control unit is added between a main control module and a multi-level converter in the present disclosure. Thus, only two optical fibers, which are connected between the main control module and the local control module, are needed, and thereby a PWM pulse driver for a multi-level converter having a simple structure is achieved. As a result, the number of the needed optical fibers is greatly reduced, thereby resulting in reduced system costs and improved system reliability.

BRIEF DESCRIPTION OF THE DRAWINGS

The objectives, features and advantages of the present disclosure will become clearer from detailed descriptions of exemplary embodiments with reference to drawings. The drawings are only for illustrating the principles of the present disclosure and are not depicted based on actual proportion. In drawings, the similar reference signs represent the same or similar elements.

DETAILED DESCRIPTION

Now, exemplary implementations will be described more comprehensively with reference to the accompanying drawings. However, the exemplary implementations may be carried out in various manners, and shall not be interpreted as being limited to the implementations set forth herein; instead, providing these implementations will make the present disclosure more comprehensive and complete and will fully convey the conception of the exemplary implementations to the ordinary skills in this art. Throughout the drawings, the like reference numbers refer to the same or the like structures, and repeated descriptions will be omitted.

Figure 1:
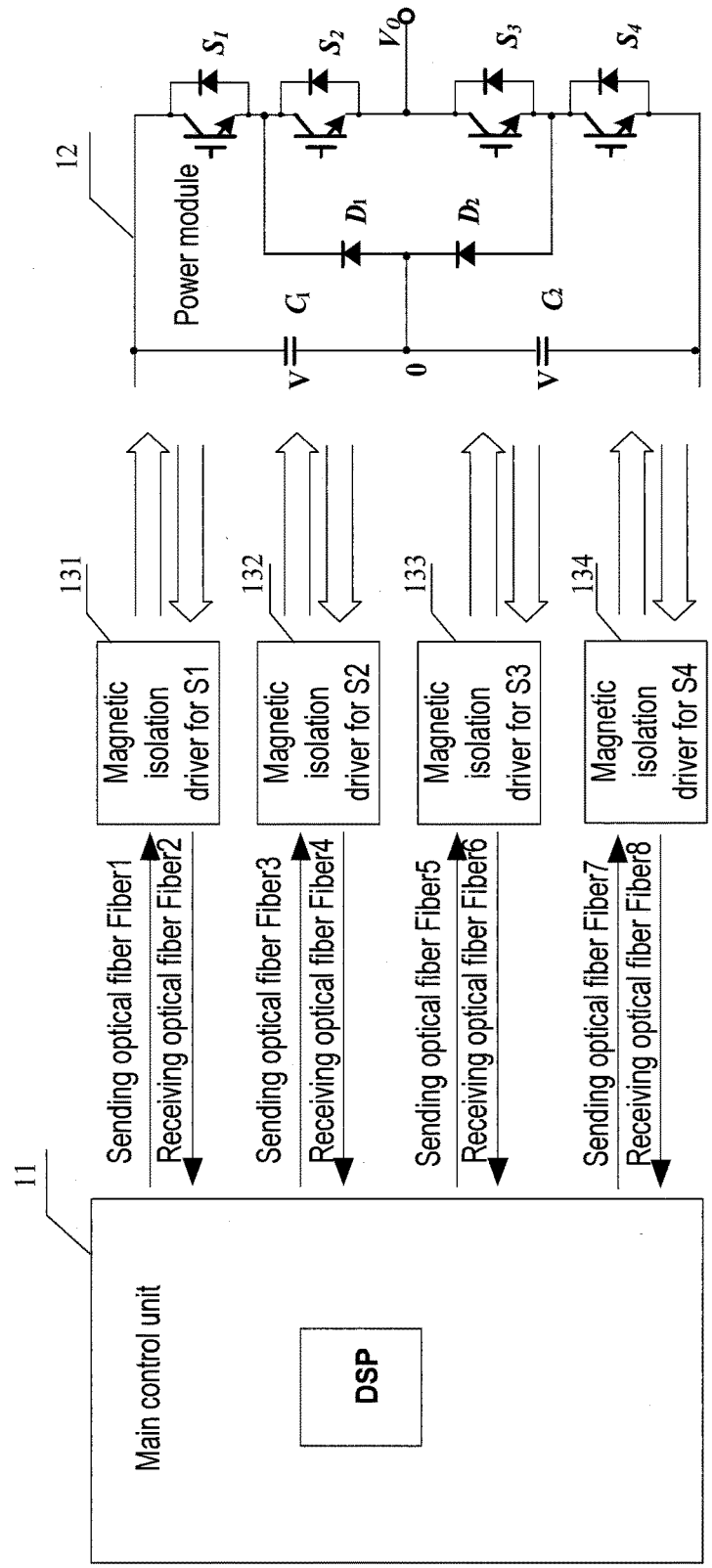
FIG. 1 is a schematic diagram showing a structure of a driving system for one phase in a PWM NPC three-level converter in conventional technologies.
Figure 2:
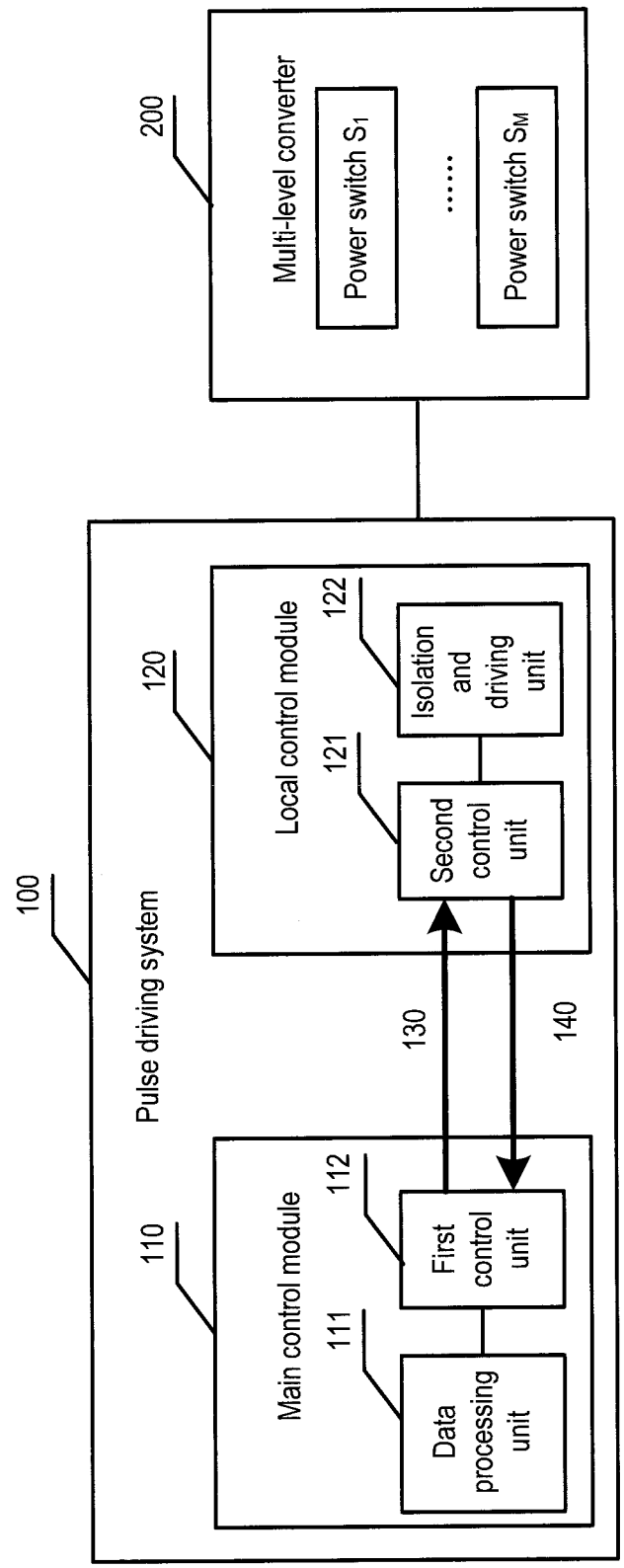
FIG. 2 is a schematic diagram showing a pulse driving system according to an embodiment of the present disclosure.

FIG. 2 is a schematic diagram showing a pulse driving system according to an embodiment of the present disclosure. The pulse driving system 100 is used for driving a multi-level converter 200 which includes at least M power switches $S_1 \sim S_M$, M≥2. The pulse driving system 100 includes a main control module 110, a local control module 120 and a first optical fiber 130. The main control module 110 generates encoding information containing driving information according to sampling information. For example, the pulse signal can be turn on and turn off signal of PWM. The first optical fiber 130 is coupled to the main control module 110 and the local control module 120 to realize the communication between the main control module 110 and the local control module 120. The local control module 120 receives the encoding information output from the main control module 110 via the first optical fiber 130 and generates control signals according to the encoding information. The local control module 120 outputs the control signals to the multi-level converter 200 so as to control on and off of the at least M power switches in the multi-level converter 200. The first optical fiber 130 serves as a sending optical fiber by which the main control module 110 sends signals to the local control module 120. By changing the structure of conventional PWM driving system, a local control unit is additionally provided between the main control module and the multi-level converter, and thus only one optical fiber can realize the transmission of control signals to the M power switches $S_1 \sim S_M$. The pulse driving system has a simple structure, and the number of needed optical fibers is greatly reduced, and thereby the costs of the system are reduced and the reliability of the system is improved.

The driving information in the embodiment may be a pulse signal or a modulation signal, but the present disclosure is not limited to this. In an embodiment, if the driving information is a modulation signal, the generation of the control signals is related to a triangular wave signal and the modulation signal. However, the main control module 110 and the local control module 120 generate a triangular wave signal based on different mechanisms, and thus the two triangular wave signals may have a certain phase difference. Thus, the encoding information may further include a first synchronization signal, the local control module 120 receives the first synchronization signal and performs adjustments according to the first synchronization signal to keep a phase of a first triangular wave signal in the local control module 120 consistent with a phase of a second triangular wave signal in the main control module 110.

In the embodiment, as shown in FIG. 2, the main control module 110 may include a data processing unit 111 and a first control unit 112, but the present disclosure is not limited to this. The data processing unit 111 receives the sampling information of the multi-level converter 200 and outputs the driving information by a control algorithm. The first control unit 112 is electrically coupled with the data processing unit 111 to receive and encode the driving information and output the encoding information.

In an embodiment, if the driving information is a modulation signal, in order to make the triangular wave signals in the data processing unit 111 and the first control unit 112 consistent with each other, the data processing unit 111 further sends a second synchronization signal to the first control unit 112, and performs adjustments according to the second synchronization signal to keep a phase of a second triangular wave signal in the first control unit 112 consistent with a phase of a third triangular wave signal in the data processing unit 111.

The first control unit 112 encodes the driving information output from the data processing unit 111 using Manchester encoding to generate the encoding information. It shall be noted that the Manchester encoding employed in the embodiment is a clock synchronization encoding technology in which clocks and data are included in data streams, and synchronous clock signals and the code information are transmitted, and there is a transition in each code bit and no direct current component exists. Thus, the technology has good self-synchronization and anti-interference capability. In the present disclosure, when using the Manchester encoding, a high level is encoded into "10", and a low level is encoded into "01".

In the embodiment, referring to FIG. 2, the local control module 120 may include a second control unit 121 and an isolation and driving unit 122, but the present disclosure is not limited to this. The second control unit 121 receives the encoding information containing the driving information, and performs data processing on the encoding information to obtain a pulse signal. The isolation and driving unit 122 is electrically coupled to the second control unit 121 to receive the pulse signal and output the control signals according to the pulse signal.

The local control module 120 obtains the pulse signal according to the encoding information from the main control unit 110, transmits the pulse signal to a multi-level converter 200 via the isolation and driving unit 122, and thus the insulated gate devices can be driven reliably. When the pulse signal does not need to be isolated from the power switch devices in the multi-level converter, the design of the driver circuit is relatively simple, and may be achieved by using driver integrated circuits, for example, IR2110. However, in many application scenarios, the local control module needs to be isolated from the multi-level converter. For example, optical isolation such as a photocoupler, or magnetic isolation such as a pulse transformer are commonly used isolation methods.

Magnetic isolation is employed in the present embodiment. As shown in FIG. 2, a pulse transformer is used to provide an electrical isolation and driver circuit. The isolation and driving unit 122 includes M isolation drivers which correspond to the power switches in the multi-level converter 200 one to one, and each has a primary side electrically coupled to the second control unit 121 and a secondary side electrically coupled to a control terminal of a corresponding power switch, but the present disclosure is not limited to this.

The second control unit 121 receives the encoding information including the driving information, and performs data processing on the encoding information to obtain a pulse signal. In an embodiment, if the driving information is a pulse signal, the second control unit 121 only needs to decode the encoding information including the pulse signal to obtain the pulse signal. In another embodiment, if the driving information is a driving signal, the second control unit 121 needs to perform decoding and data processing according to the decoded modulation signal to obtain the pulse signal.

Figure 3:
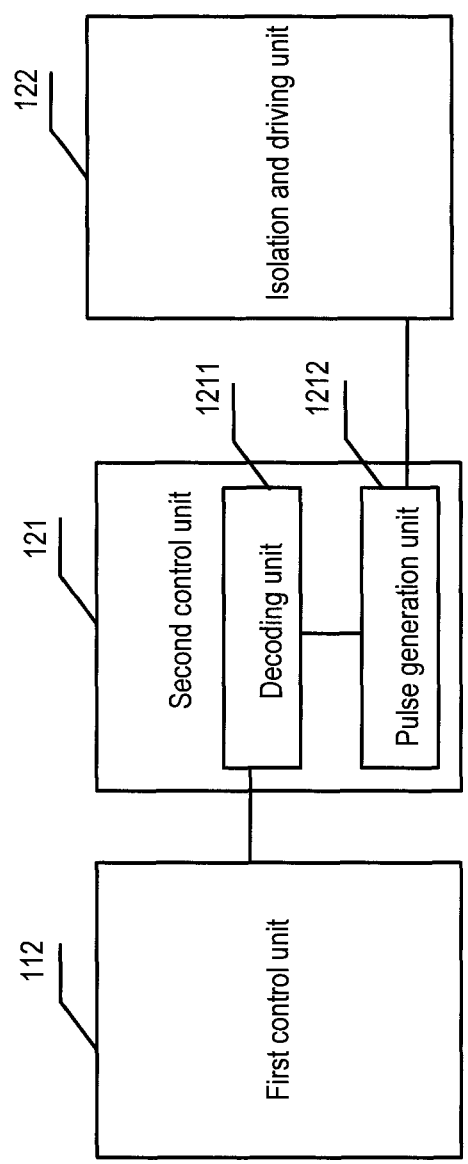
FIG. 3 is a schematic diagram showing a structure of a second control unit and connection relationship between the second control unit and related units according to an embodiment of the present disclosure.

If the driving information is a driving signal, as shown in FIG. 3, the second control unit 121 may further include a decoding unit 1211 and a pulse generation unit 1212. The decoding unit 1211 decodes the encoding information output from the main control module 110 (specifically, from the first control unit 112), and output the decoded modulation signal. The pulse generation unit 1212 is electrically coupled to the decoding unit 1211 to receive the modulation signal, and output the pulse signal by comparing the modulation signal and a first triangular wave signal in the second control unit 121.

In one embodiment, if the main control module 110 has a failure, the driving information sent from the main control module 110 to the local control module 120 is a first failure signal, and the local control module 120 outputs a failure control signal according to the encoding information which contains the first failure signal, wherein the failure control signal is configured to turn off all the power switches in the multi-level converter 200. For example, if the main control module 110 detects abnormal conditions in the system such as overvoltage, overcurrent or instability in control power supplies, the main control module 110 will generate a failure signal which will be reflected in the driving information.

In other embodiment, failures may also occur at the multi-level converter 200 side. If the multi-level converter 200 has a failure, the control signal output from the local control module 120 is a failure control signal which is configured to turn off all the power switches in the multi-level converter 200. As shown in FIG. 2, the pulse driving system further includes a second optical fiber 140 which is coupled to the main control module 110 and the local control module 120. The second optical fiber 140 serves as a receiving optical fiber by which the main control module 110 receives signals from the local control module 120. If the multi-level converter 200 has a failure, for example, abnormalities in power switches such as overvoltage, overcurrent, or over-high temperature and the like, the local control module 120 detects out such abnormalities and transmits a second failure signal to the main control module 110 via the second optical fiber 140, the main control module 110 outputs a first failure signal according to the second failure signal to block the control signals for the multi-level converter 200. The sequential procedure is the same as that when the main control module 110 has a failure, and repeated description is omitted.

If Manchester encoding is used as the encoding method, the convention may be as follows: a high level signal is encoded as "10", and a low level signal is encoded as "01". Thus, during normal signal transmission, four or more consecutive "0" or "1" will not occur. In the embodiment, the encoding signals for the first and second failure signals are "0000" and "1111", but the present disclosure is not limited to this. Once consecutive "0000" or "1111" occurs in the signals received by the main control module or the local control module, it is indicated that a failure occurs, and prompt response is needed. The failure in the system may be known within a short time and immediate measures may be taken to remove the failure.

Figure 4:
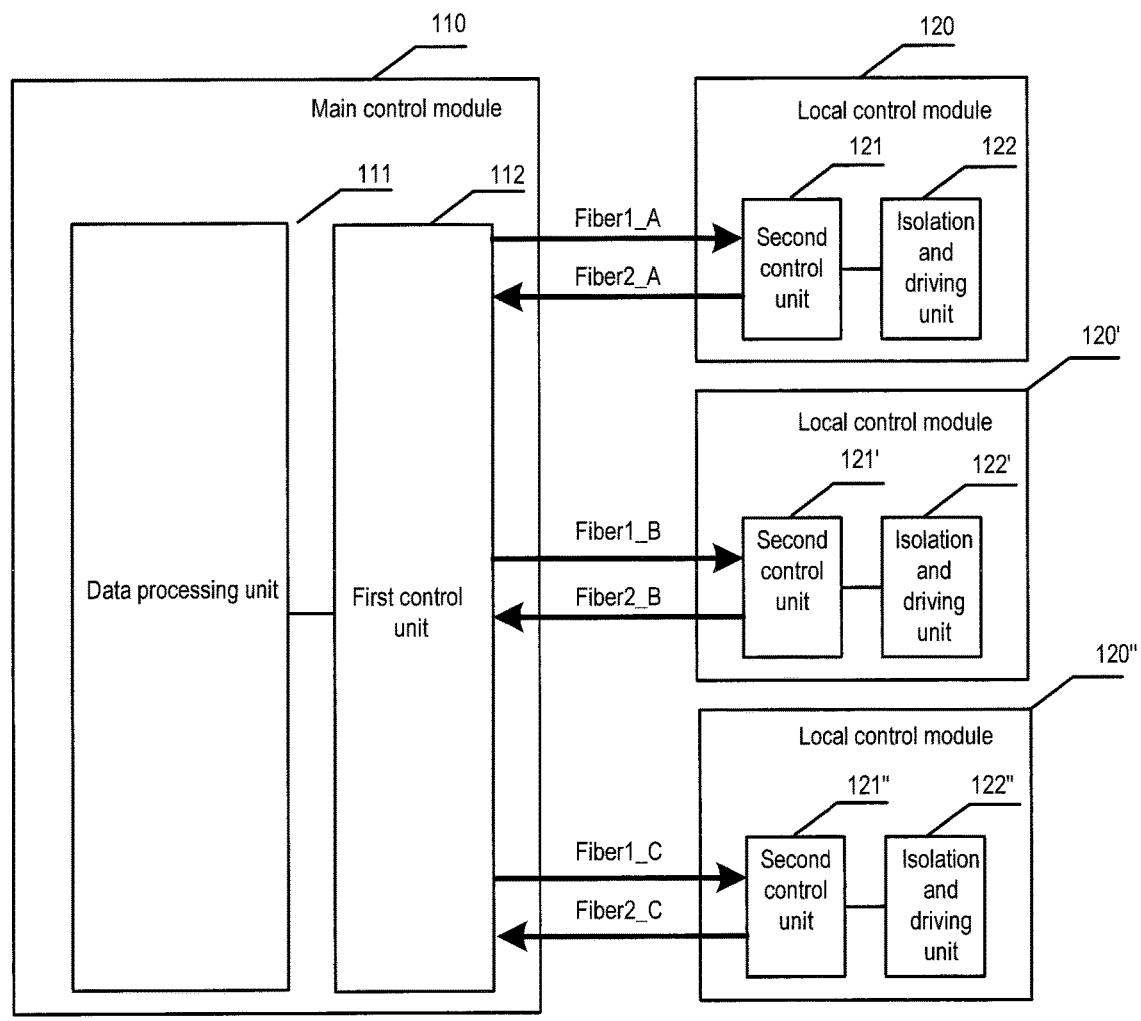
FIG. 4 is a schematic diagram showing communication between a main control module and local control modules for three phases according to an embodiment of the present disclosure.

Although the pulse driving system in FIG. 2 and most contents in the embodiment are described with a single phase as an example, the pulse driving system is also applicable in a three-phase (A, B and C) circuit, as shown in FIG. 4. The control method for each of the single phase A, B or C in FIG. 4 is as shown in FIG. 3, and repeated descriptions are omitted here. The main control module 110 communicates with three local control modules 120, 120' and 120" via sending optical fibers (i.e., Fiber1_A, Fiber1_B, Fiber1_C) and receiving optical fibers (i.e., Fiber2_A, Fiber2_B, Fiber2_C). In the three-phase circuit as shown in FIG. 4, the main control module uses the sending optical fiber for each phase to provide control signals to a corresponding local control module for the single phase circuit so as to control on and off of all switches in the single phase circuit. A local control module in a corresponding single phase circuit uses a corresponding receiving optical fiber to provide a failure signal to the main control module.

It shall be noted that in the three-phase circuit, any one of the power switches in respective phases A, B and C encounters abnormalities such as overvoltage, overcurrent or over-high temperature, second control units corresponding to respective power converters for each phase can detect such abnormalities, and set the control signals into a failure control signal, for example, set all the signals into a low level, so as to block the power switches in the failed phase. Also, the second control unit can send the encoding signal (for example, "0000") of the second failure signal to the data processing unit 111 in the main control module via the second optical fiber, the data processing unit 111 sends a first failure signal which is encoded by the first control unit 112 in the main control module to generate a encoding signal such as "0000". The encoding signal "0000" is sent to the local control modules for the three phases A, B and C via all the sending optical fibers Fiber1_A, Fiber1_B, and Fiber1_C (as shown in FIG. 3). Upon receiving the "0000", the local control modules promptly generate off signals to turn off all the power switches (which may be transistors) in the three phases to ensure safety of the power converter.

As can be seen from the above technical solutions, the structure of conventional PWM driving system is changed, i.e., a local control unit is added between a main control module and a multi-level converter in the present disclosure. Thus, only two optical fibers are needed for realizing transmission of control signals for the M power switches $S_1 \sim S_M$ and failure signals, and thereby a pulse driver having a simple structure is achieved. As a result, the number of the needed optical fibers is greatly reduced, thereby resulting in reduced system costs and improved system reliability.

An embodiment provides a multi-level pulse driving system for driving a multi-level converter, including the main control module, the local control module, the sending optical fiber and the receiving optical fiber as mentioned in the above embodiments. In the embodiment, the data processing unit is exemplified as a DSP chip, the first control unit 112 and the second control unit are exemplified as FPGA chips, and the driving information is exemplified as a modulation wave, but the present disclosure is not limited to this.

Figure 5:
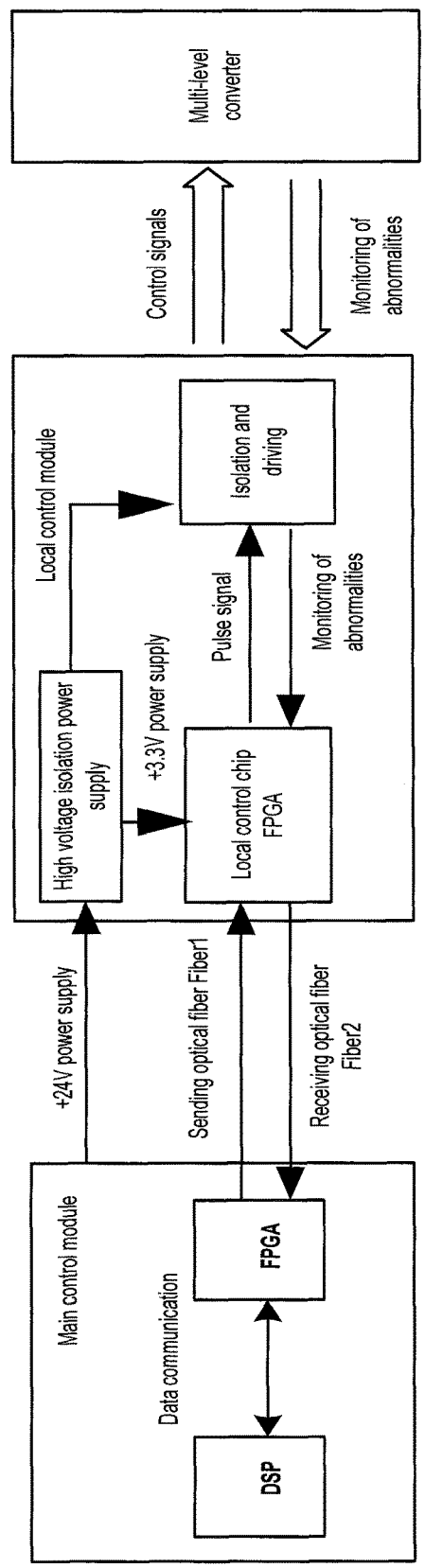
FIG. 5 is a schematic diagram showing a structure of a pulse driving system according to an embodiment of the present disclosure.

FIG. 5 shows a single phase circuit diagram. The circuit diagram is only for illustrative purposes, and the principles and structures for other phases are similar and detailed descriptions thereof are omitted. The DSP in the main control module receives a voltage, a current sensor samples a current and/or current signal, and the main control module generates a modulation wave for controlling the power switches in the multi-level converter according to a certain control algorithm. The FPGA in the main control module is responsible for data communication with the DSP, receiving the modulation wave generated by the DSP and special function instructions (which may be defined by users or set depending on actual conditions), encoding the received signals using Manchester encoding to obtain encoding signals and sending the encoding information to the local control module via a sending optical fiber Fiber1. Also, the FPGA in the main control module is responsible for receiving the failure information output by the local control module when the multi-level converter has a failure, and communicating the failure information to the DSP.

In an embodiment, the FPGA and the DSP in the main control module are generally mounted on a PCB, the information transmission between them can be realized by serial data, for example, Serial Peripheral Interface (SPI) communication or Serial Communication Interface (SCI) communication. Also, other parallel data transmission methods can be used, for example, data and address buses.

The local control module comprises a local control chip (FPGA), an isolation driver and a high voltage isolation power supply. The FPGA in the main control module sends signals to the local control chip FPGA via a sending optical fiber Fiber1, and receives signals from the local control chip FPGA via a receiving optical fiber Fiber2. The local control chip FPGA receives the encoding information (including a modulation wave, "a function code", setting values required by the local control unit, and the like) sent from the main control module via the optical fiber Fiber1, and performs data processing on the received information. The data processing herein can be divided into the following three parts. In a first part, the local control chip FPGA decodes the encoding information to obtain the modulation wave and the special function instructions. In a second part, the local control chip FPGA compares the triangular wave generated in the local control chip FPGA with the modulation wave to generate a "first pulse signal". In a third part, the local control chip FPGA generates a special driving pulse according to the special function instructions, and generates a "pulse signal" in combination with the "first pulse signal". Specific combination method is dependent on actual conditions, and detailed descriptions are omitted here. The local control chip FPGA is electrically coupled to the isolation driver which isolates and amplifies the "pulse signal" to generate the "control signal" to the multi-level converter.

If any one of the power switches in the multi-level converter has abnormalities such as overvoltage, overcurrent, or over-high temperature, the local control chip FPGA detects these abnormalities, and sets the control signal as a failure control signal, for example, setting all the control signals as low level, so as to block the power switches in the failed phase. Also, the local control chip FPGA sends the encoding signal (for example, "0000") of the second failure signal to the DSP in the main control module via a receiving optical fiber Fiber_2, the DSP sends a first failure signal which is encoded by the FPGA in the main control module to generate an encoding signal like "0000". The signal "0000" is sent to the local control module via the sending optical fiber Fiber1. Upon receiving "0000", the local control module promptly generates an off signal to turn off all the power switches (which may be transistors) so as to ensure the safety of the power converter.

If the main control module 110 has a failure, the DSP in the main control module sends an encoding signal (for example, "0000") of the first failure signal to the local control chip FPGA via the sending optical fiber Fiber1, the local control chip FPGA promptly outputs a failure control signal, for example, setting all the control signals as low level, so as to block the failure control signal of the power switches in a corresponding phase.

In the embodiment, the power supplied to the local control chip FPGA and the isolation driver is provided by the high voltage isolation power supply, the main control module provides a power of +24V to the high voltage isolation power supply, the high voltage isolation power supply provides a power of +3.3V to the local control chip FPGA, and provide a power of +15V to the isolation driver. Because magnetic core isolation exists between the multi-level converter and the local control module, i.e., a magnetic isolation driver exists, the voltage isolation between the high voltage isolation power supply and the main control module can have a reduced insulation degree.

Figure 6:
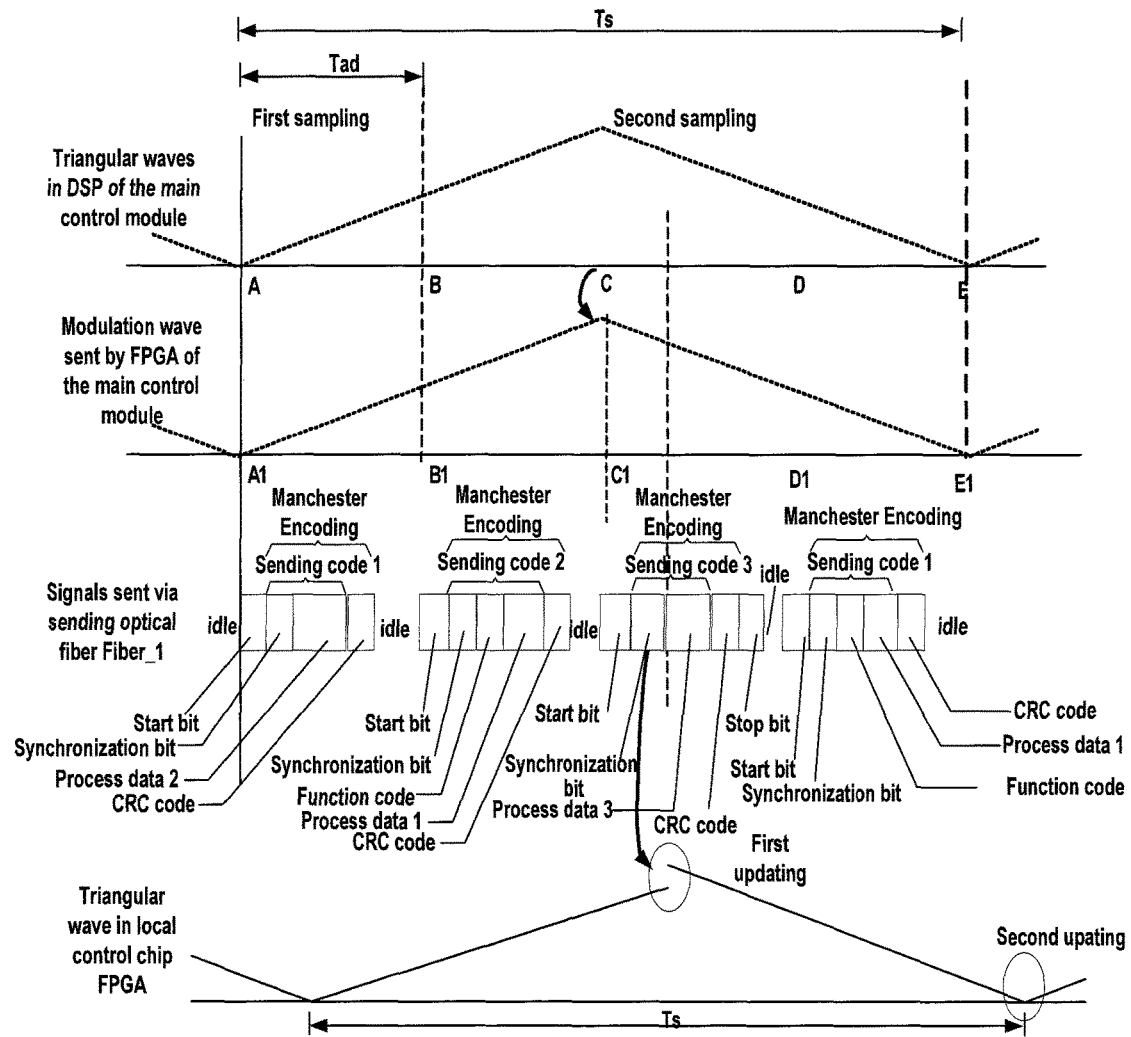
FIG. 6 is a graph showing driving sequences of PWM dual-sampling-dual-updating in a multi-level converter in which synchronization delay is not compensated (a control delay is Ts/2) according to an embodiment of the present disclosure.

The generation of the pulse signal is related to the triangular wave, and thus it shall be guaranteed that a second triangular wave in the DSP of the main control module and the first triangular wave in the local control chip FPGA are consistent in phase. FIG. 6 is driving sequence graph showing signal transmission and synchronization of the triangular waves in an embodiment of the pulse driving system in FIG. 5. Referring to FIG. 6, the DSP in the main control module sends information to the FPGA in the main control module. In a switching period Ts, the DSP in the main control module performs computation of a control algorithm every Ts/4, for example, in the AB interval, BC interval, the CD interval, and the DE interval, and a new modulation wave is calculated in each interval. In the embodiment, DSP in the main control module samples the current and voltage information (for example, information related to the control algorithm, such as the grid current or output current from the converter, the grid voltage or the output voltage from the converter, bus voltage information, temperature information of the main power unit) at time points A and C, and then performs closed loop control computation or open loop computation to generate a modulation wave. Thus, in a switching period Ts, the modulation wave can be updated for twice, and this can be referred to as dual-sampling-dual-updating. In other embodiments, in one switching period Ts, sampling can be performed for once, and the modulation wave can be updated for once, i.e., single-sampling-single-updating. However, the present disclosure is not limited to this.

In the embodiment, the DSP in the main control module outputs a first synchronization signal at the time point C, the FPGA in the main control module receives the first synchronization signal, and set the phase of the triangular wave (see the waveform in the second row in FIG. 7) in the FPGA of the main control module as consistent with the phase of the triangular wave (see the waveform in the first row in FIG. 7) in the DSP so as to keep synchronization. The implementation can be as follows. A counter (not shown) exists in both DSP and FPGA, the counter counts from 0 to a maximum value, and then counts from the maximum value to 0 so as to generate a triangular wave. Thus, in the embodiment, the DSP transmits the first synchronization signal at the time point C to the FPGA in the main control module via an IO port. After receiving the first synchronization signal, the FPGA in the main control module updates the count value of the counter in the FPGA to the maximum value, and then the synchronization between the triangular waves in the FPGA o and the DSP of the main control module can be realized.

As shown in FIG. 6, the FPGA in the main control module sends the encoding information to the local control chip FPGA in the local control module via the sending optical fiber Fiber_1. The encoding information includes a modulation wave, a function code, a second synchronization signal, setting parameters of the local control chip FPGA and the like. The method for sending information to the local control chip FPGA in the local control module from the FPGA in the main control module may be as follows. However, the present disclosure is not limited to this.

At the time points A1, B1, C1, and D1, the FPGA in the main control module sends signals via the sending optical fiber Fiber_1 at a certain rate. The format for sending signals is: a start bit (00011), a sending code 1 or a sending code 2 or a sending code 3, a CRC (Cyclic Redundancy Check) code and an idle bit. The start bit is composed of 00011, and can be set by users, and however the present disclosure is not limited to this. The original data of the sending code 1, the sending code 2, the sending code 3, and the CRC code are manchester-encoded and then transmitted. The encoding principle of the Manchester encoding may be as follows: "10" for a high level, and "01" for a low level. Alternatively, the encoding principle of the Manchester encoding may be as follows: "01" for a high level, and "10" for a low level. The CRC code is a Cyclic Redundancy Check code for checking the data to be transmitted to avoid mistakes in data transmission. The data includes a function code, a data code 1, or a data code 2 or a data code 3.

The sending code 1, the sending code 2, or the sending code 3 includes some control information and control instructions as required by the local control module, for example, a modulation wave, a current direction, a function code, parameter settings and the like. In order to enable the local control module to update the modulation wave for twice in one switching period Ts and to guarantee that the AD sampling and the update time is within Ts/2, the control information and control instructions need to be encoded into the sending code 1, the sending code 2, and the sending code 3 for transmission. The contents in the codes are exemplified as follows.

"Process Data 1"

By the "Process Data 1", the modulation wave is transmitted to the local control chip FPGA by the FPGA in the main control module. In FIG. 6, the DSP in the main control module samples and computes the modulation wave at the time points A and C, the FPGA in the main control module transmits the modulation wave at the time points B1 an D1, and the local control chip FPGA receives the modulation wave at the time points C1 and A1, and updates the modulation wave at the peaks and valleys of the triangular wave in the local control chip FPGA. The duration for AD sampling and the PWM updating is Ts/2, and the "Process Data 1" in the sending code 1 necessarily includes the modulation wave and information related to the modulation.

"Process Data 2" and "Process Data 3"

The "Process Data 2" and "Process Data 3" in FIG. 6 can convey some setting values, for example, the settings for flying capacitor protection point, the setting values for the voltage across a flying capacitor, the settings for the switch frequencies, and the like. That is, information not related to the modulation can be carried in the "Process Data 2" and "Process Data 3".

"Synchronization Bit"

The "Synchronization Bit" includes a second synchronization signal by which the triangular waves in the FPGA in the main control module and the local control chip FPGA can be synchronized. In FIG. 6, if the "Synchronization Bit" is manchester-encoded as "1010" (the code may set by users, but the present disclosure is not limited to this), it is indicated that the triangular wave in the local control chip FPGA needs to be synchronized with the triangular wave in the main control module. That is, if the local control chip FPGA receives a synchronization code "1010", the triangular wave in the local control chip FPGA needs to be updated into the maximum value. If the "Synchronization Bit" is manchester-encoded as "0101" (the code may be set by users, but the present disclosure is not limited to this), it is indicated that the triangular wave in the local control chip FPGA does not need to be synchronized with the triangular wave in the main control module, and the counters can count according to preset counting principle. The "Synchronization Bit" in the sending code 1 and the sending code 2 conveys "0101", and conveys "1010" in the sending code 3.

"Function Code"

The "Function Code" is composed of particular elements which are defined based on conventions. After receiving the "Function Code", the local control chip FPGA generates special logic function, for example, outputting flying capacitor voltage-balancing pulse, outputting pre-charge pulse, outputting a start self-check pulse and the like, and generates special driving pulses.

Figure 7:
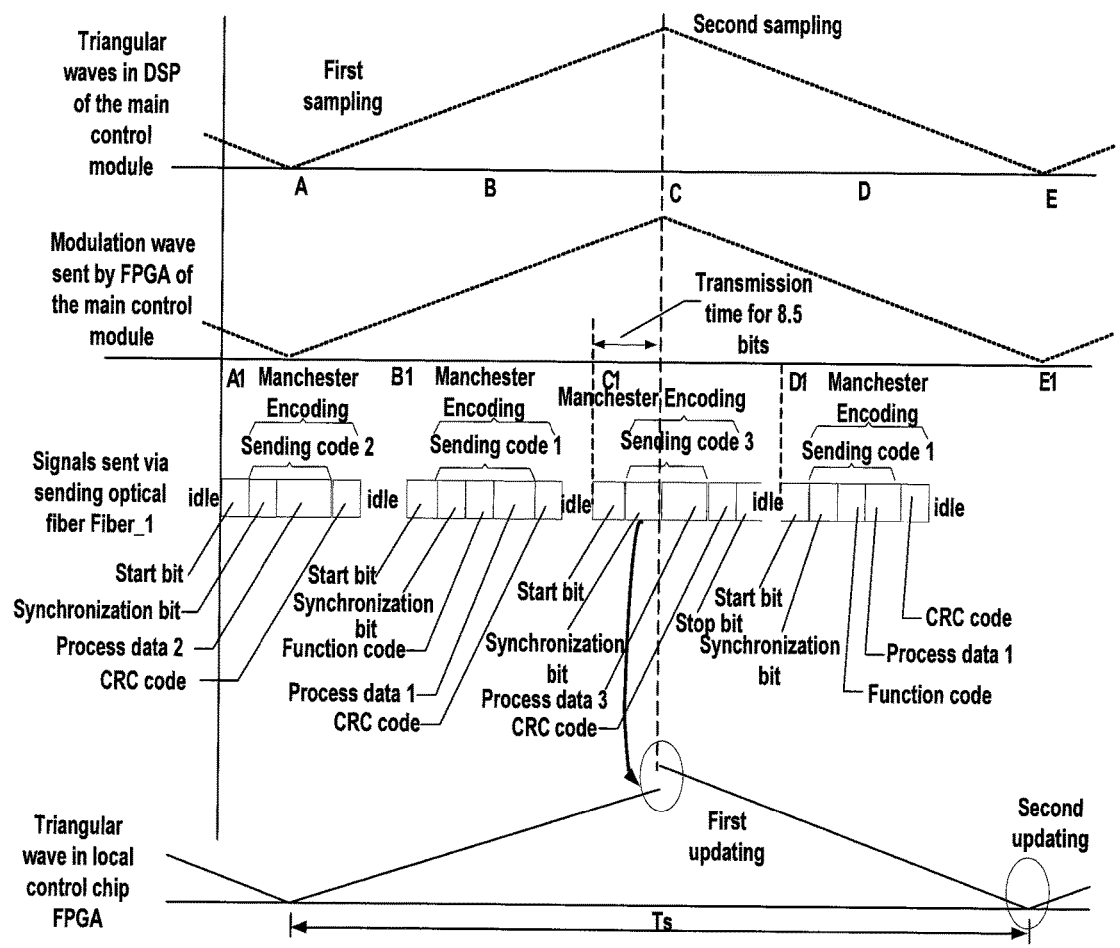
FIG. 7 is a graph showing driving sequences of PWM dual-sampling-dual-updating in a multi-level converter in which synchronization delay is compensated (a control delay is Ts/2) according to an embodiment of the present disclosure.

Referring to FIG. 6, when the FPGA in the main control module sends signals to the local control chip FPGA, the signals which are sent in order are the sending code 2, the sending code 1, the sending code 3 and the sending code 1, and more sending codes can be sent later as required. In the driving sequence in FIG. 6, the main control module sends a start bit "00011", and a synchronization bit "1010", the local control chip FPGA samples the middle point of the data bit sent via the sending optical fiber Fiber_1, the sampling data rate of the local control chip FPGA is far greater than the data sending rate of the sending optical fiber Fiber1. For example, the data sampling rate is 75 MHz, and the data sending rate is 2.5 MHz. That is, the sending optical fiber Fiber1 updates the data for once while the local control chip FPGA samples for 75/2.5=30 number of times. Generally, the data sampled in the middle of sampling period is better. If the number of the sampling times is 30, the data sampled in the 14th, 15th and 16th sampling are taken as the final sampled data. The phase difference between the two triangular waves is 8.5 bit sending time. The time difference can generate a certain control delay, and thus the triangular waves in the local control chip FPGA and the DSP of the main control module are not exactly synchronous. In order to compensate such delay, delay compensation is needed, as shown in FIG. 7 which illustrates the driving sequence. Similarly to FIG. 6, the FPGA in the main control module sends signals to the local control chip FPGA, i.e., the sending code 2, the sending code 1, the sending code 3 and the sending code 1 are sent in order. And, more sending codes can be sent later as required and detailed implementations will not be set forth herein.

In FIG. 7, the DSP in the main control module sends a synchronization signal to the FPGA in the main control module 8.5-bit transmission time earlier than the time point C, so that a phase of a counter 2 in the FPGA of the main control module is 8.5-bit transmission time ahead of the phase of a counter 1 in the DSP. Thus, the delay is compensated and the triangular waves in the local control chip FPGA and the DSP of the main control module are synchronous. The local control chip FPGA updates the modulation wave at the peaks and valleys of the triangular waves. As can be seen from the figure, the DSP in the main control module samples and computes the modulation wave at the time points A and C, and the local control chip FPGA updates the modulation wave at the peaks and valleys of the triangular waves, and the control delay is Ts/2.

In view of FIGS. 6 and 7 and the above contents, when the PWM switching frequency is relatively low, the DSP in the main control module can complete the computation of the control algorithm within Ts/4, and then the dual-sampling-dual-updating as shown in FIGS. 6 and 7 can be realized. However, if the PWM switching frequency is relatively high, the DSP in the main control module cannot complete the computation of the control algorithm within Ts/4, but can complete the computation of the control algorithm within Ts/2, and then single-sampling-single-updating can be employed.

Figure 8:
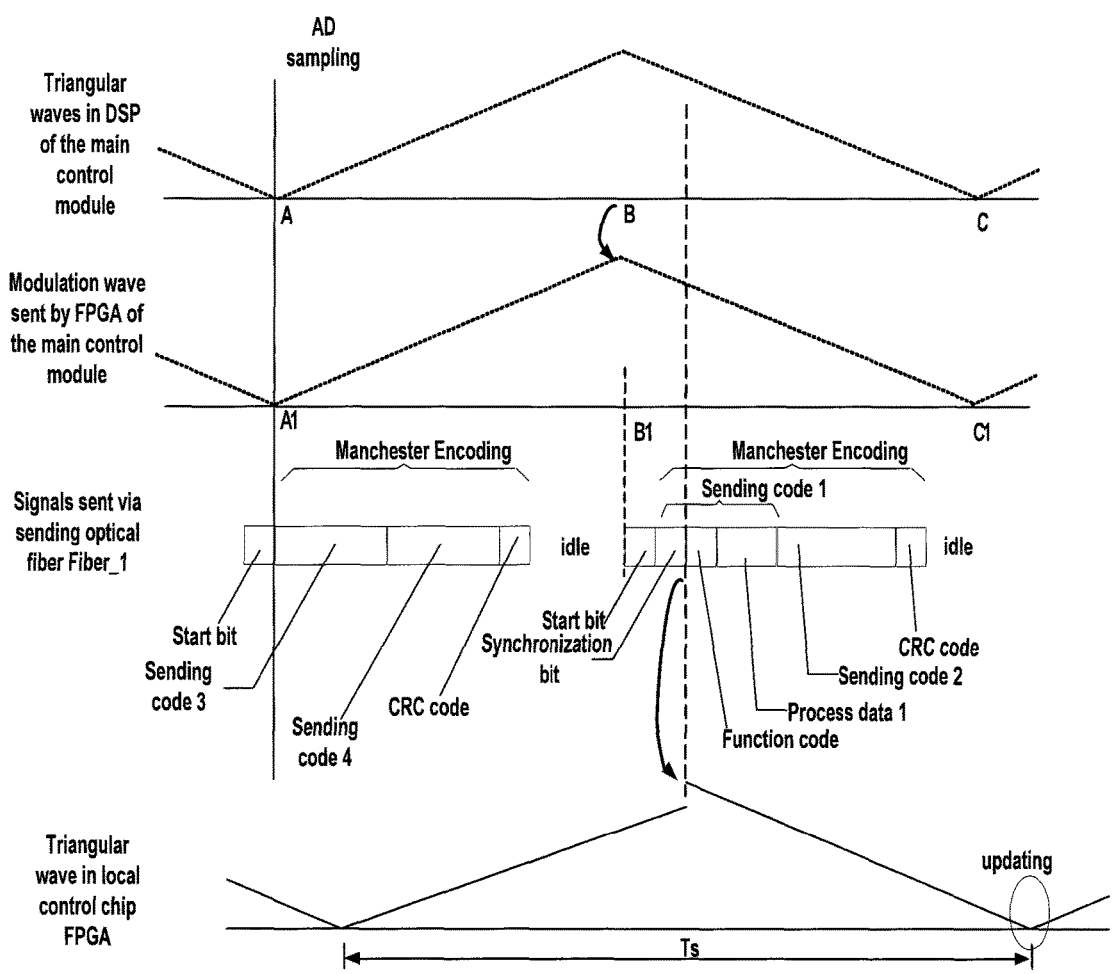
FIG. 8 is a graph showing driving sequences of PWM single-sampling-single-updating in a multi-level converter in which synchronization delay is not compensated (a control delay is Ts) according to an embodiment of the present disclosure.

FIG. 8 is a graph showing driving sequences for single-sampling-single-updating according to an embodiment of the pulse driving system. In a switching period Ts, the DSP in the main control module performs computation of control algorithm every Ts/2, i.e., at the AB interval and the BC interval. The DSP in the main control module samples the voltage and current information at the time point A, and then performs closed loop control computation or open loop computation to generate a modulation wave. At the time point B, the DSP in the main control module transmits a first synchronization signal to the FPGA in the main control module via an IO port. Upon receiving the first synchronization signal, the FPGA in the main control module updates the count value of the counter in the FPGA to be the maximum value to realize the synchronization between the triangular waves in the FPGA and DSP of the main control module, as shown by the dotted line in FIG. 8.

As shown in FIG. 8, at the time points A1 and B1, the FPGA in the main control module sends encoding information to the local control chip FPGA in the local control module via the sending optical fiber Fiber_1 at a certain rate (for example, 2.5 Mb/s). The format for sending signals is: a start bit (00011), a synchronization bit, a function code, a sending code 1 or a sending code 2 or a sending code 3 or a sending code 4, a CRC (Cyclic Redundancy Check) code and an idle bit. The synchronization bit, the function code, the sending code 1 or the sending code 2 or the sending code 3 or the sending code 4, and the CRC code are manchester-encoded and then transmitted. The "Process Data 1" in the sending code 1 has to include the modulation wave and information related to the modulation, and the information not related to the modulation wave and the modulation can be transmitted in the "Process Data 2", "Process Data 3" and "Process Data 4". In one Ts, the "Process Data 1" only needs to be transmitted for once, and thus more data can be transmitted within the rest of the time. That is, a "Process Data 4" can follow the "Process Data 3". Similarly, if time is enough, "Process Data 5", "Process Data 6" and "Process Data 7" can be transmitted as well depending on actual conditions.

Figure 9:
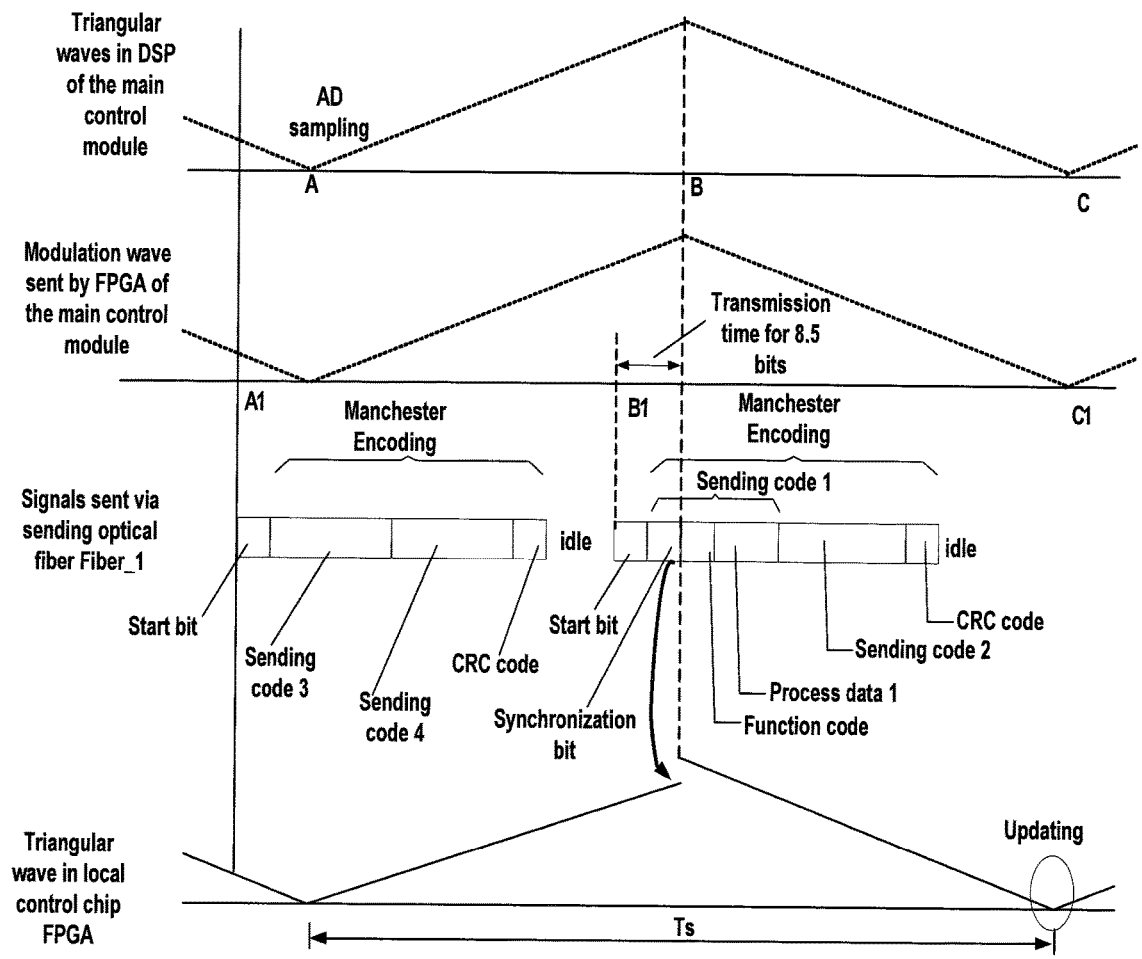
FIG. 9 is a graph showing driving sequences of PWM single-sampling-single-updating in a multi-level converter in which synchronization delay is compensated (a control delay is Ts) according to an embodiment of the present disclosure.

Also, in order to compensate the delay, the driving sequences for multi-level PWM single-sampling-single-updating capable of compensating the synchronization delay may be as shown in FIG. 9. In FIG. 8, the triangular waves in the local control chip FPGA and the DSP in the main control module are not synchronized. If the start bit is "00011" and the synchronization bit is "1010", the phase difference between the two triangular waves is the transmission time for 8.5 bits. This time difference can result in a certain control delay. The driving sequences as shown in FIG. 9 can compensate such delay such that the triangular waves in the local control chip FPGA and the DSP in the main control module are synchronized. The local control chip FPGA updates the modulation wave at the valleys of the triangular wave, and as can be seen, the DSP samples and computes the modulation wave at the time point A, the triangular wave in the FPGA of the local control module is updated at the valley, and the control delay is about Ts.

Referring to FIGS. 8 and 9, when the FPGA in the main control module sends signals to the local control chip FPGA, the signals sent in order are: a sending code 3, a sending code 4, a sending code 1 and a sending code 2. And, more sending codes can be sent sequentially as required, and detailed descriptions are not set forth herein.

Figure 10:
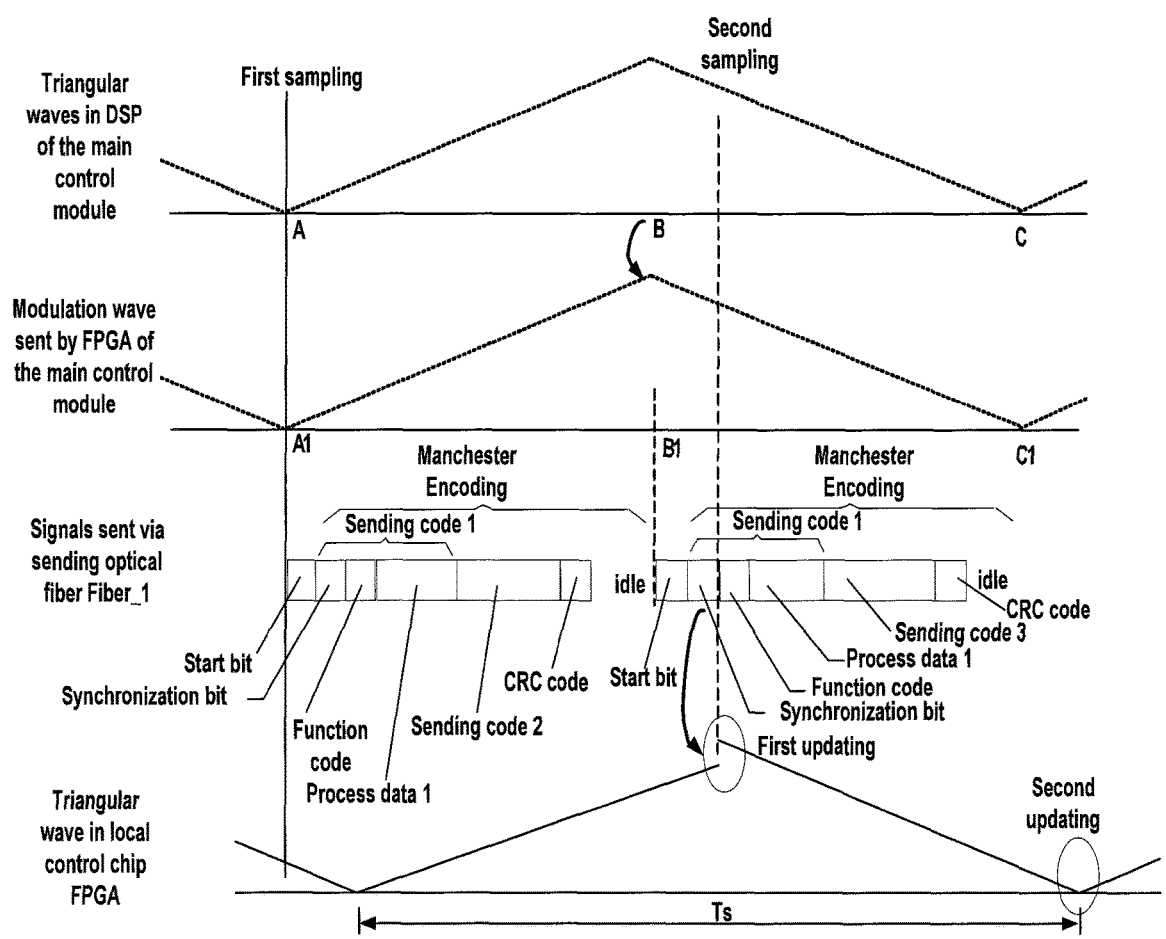
FIG. 10 is a graph showing driving sequences of PWM dual-sampling-dual-updating in a multi-level converter in which synchronization delay is not compensated (a control delay is Ts) according to an embodiment of the present disclosure.

FIG. 10 is a graph showing driving sequences for dual-sampling-dual-updating according to an embodiment of the pulse driving system. The difference between the present embodiment and the embodiments as shown in FIGS. 8 and 9 resides in that the method for the FPGA in the main control module sending signals to the local control chip FPGA is different. As shown in FIG. 10, the signals sent in order from the FPGA in the main control module to the local control chip FPGA are a sending code 1, a sending code 2, a sending code 1, and a sending code 3, and the sent signals are different from the above embodiments in FIGS. 6 and 7 and the embodiments in FIGS. 8 and 9. The format for sending signals is: a start bit (00011), a synchronization bit, a function code, a sending code 1 or a sending code 2 or a sending code 3, a CRC code and an idle bit. The synchronization bit, the function code, the sending code 1 or the sending code 2 or the sending code 3, and the CRC code are manchester-encoded and then transmitted. The "Process Data 1" in the sending code 1 has to include the modulation wave and information related to the modulation, and the information not related to the modulation wave and the modulation can be transmitted in the "Process Data 2", "Process Data 3".

Figure 11:
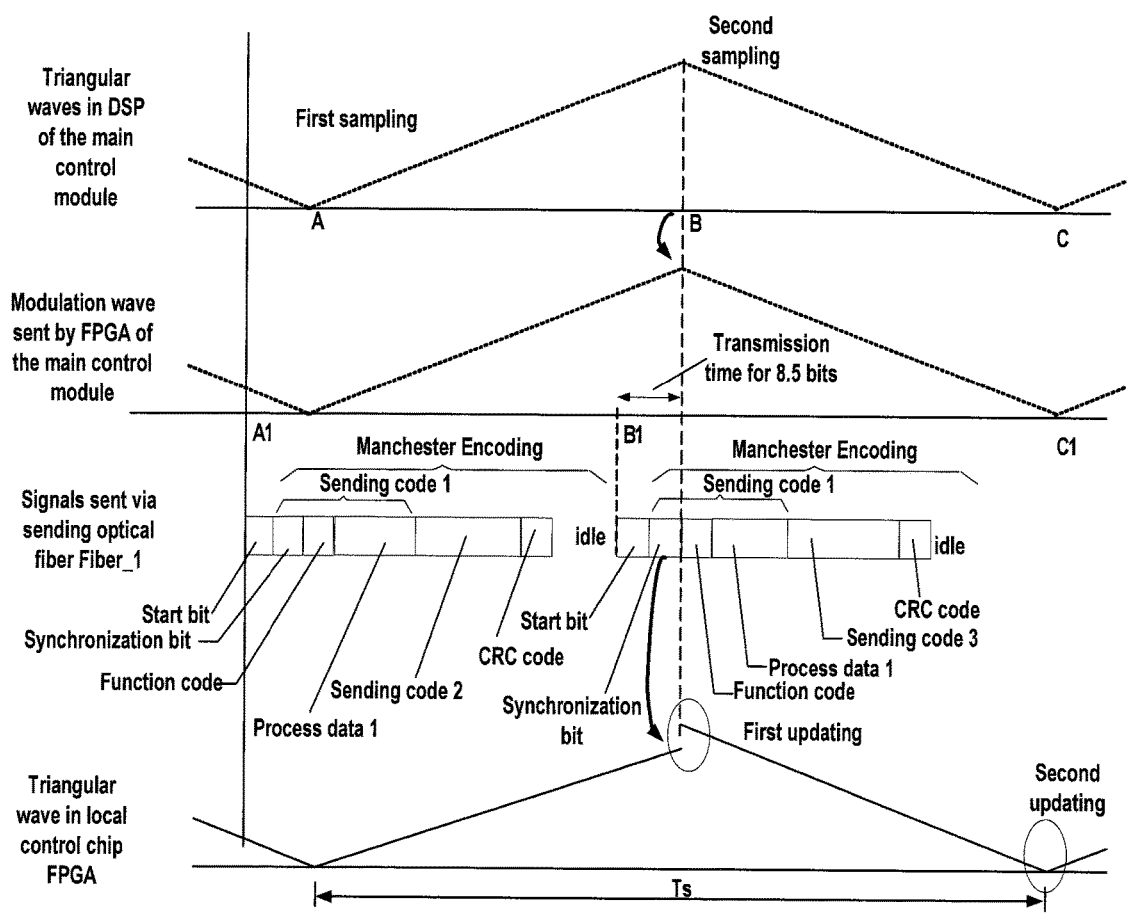
FIG. 11 is a graph showing driving sequences of PWM dual-sampling-dual-updating in a multi-level converter in which synchronization delay is compensated (a control delay is Ts) according to an embodiment of the present disclosure.

In FIG. 10, the triangular waves in the local control chip FPGA and the DSP in the main control module are not synchronized. If the start bit is "00011" and the synchronization bit is "1010", the phase difference between the two triangular waves is the transmission time for 8.5 bits. This time difference can result in a certain control delay. The driving sequences as shown in FIG. 11 can compensate such delay such that the triangular waves in the local control chip FPGA and the DSP in the main control module are synchronized. The local control chip FPGA updates the modulation wave at the valleys of the triangular wave, and as can be seen, the DSP samples and computes the modulation wave at the time points A and B, the triangular wave in the FPGA of the local control module is updated at the valley, and the control delay is about Ts. Referring to FIG. 11, similarly to FIG. 10, the signals sent in order from the FPGA in the main control module to the local control chip FPGA are a sending code 1, a sending code 2, a sending code 1, and a sending code 3, and more sending codes can be sent sequentially as required.

Figure 12:
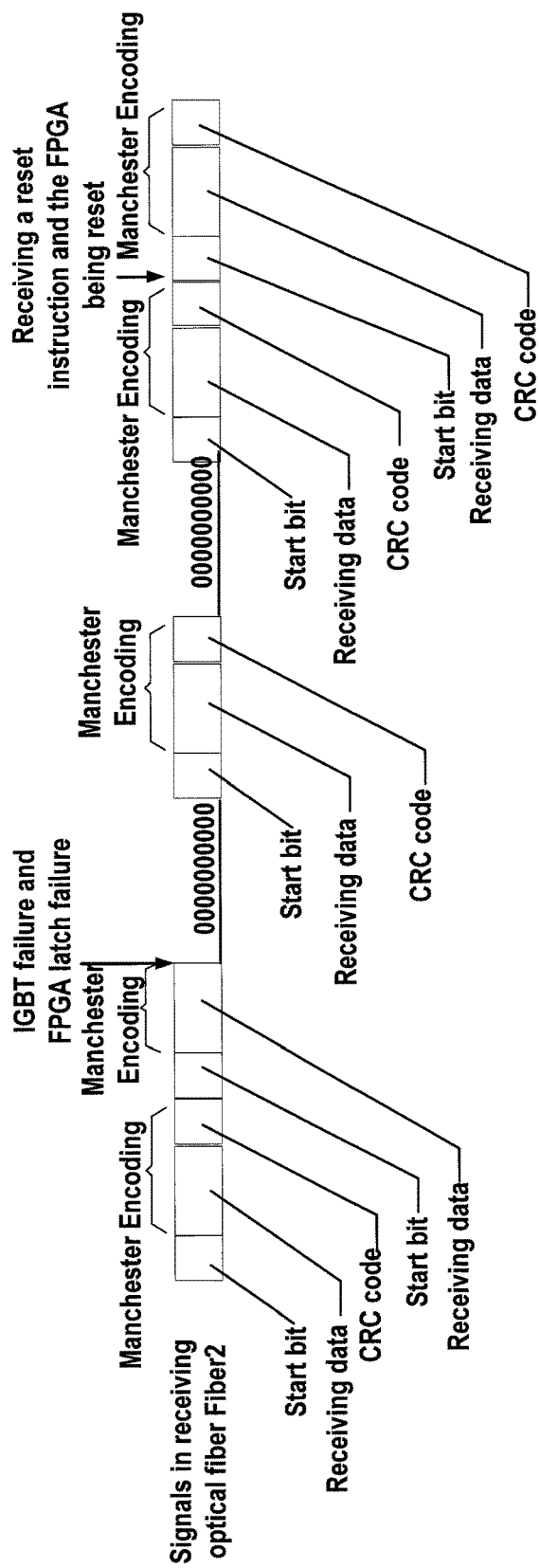
FIG. 12 is a graph showing signal sequence received by a main control module when a failure occurs according to an embodiment of the present disclosure.

No matter what driving sequence (for example, any one of the driving sequences as discussed above) is employed, failures in the system are inescapable, and thus the encoding signals of the first/second failure signal sent via the sending optical fiber Fiber_1 and the receiving optical fiber Fiber_2 need to include "0000" or "1111". Taking the receiving optical fiber Fiber_2 as an example, FIG. 12 shows the encoding information of the receiving optical fiber Fiber_2 if the system has a failure. The encoding information of the receiving optical fiber Fiber_2 includes: "0000000000". Upon receiving the encoding information, the FPGA and DSP in the main control module can immediately know that a failure occurs at the converter side, and take corresponding actions to ensure safety of the system.

Figure 13:
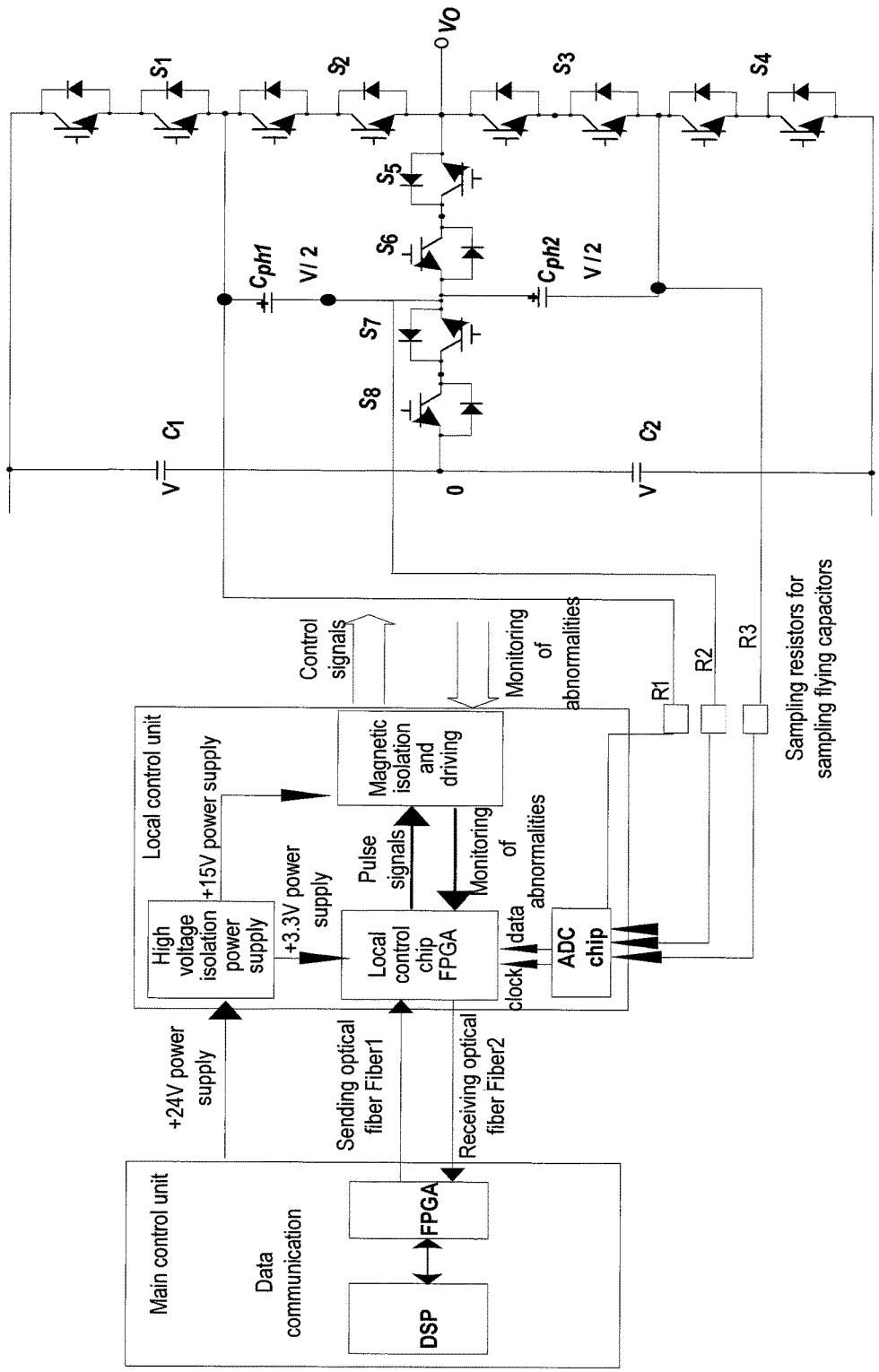
FIG. 13 is a schematic diagram showing a structure of a five-level pulse driving system including a flying capacitor unit according to an embodiment of the present disclosure.

In an embodiment of the present disclosure, the multi-level converter may further include flying capacitors, for example, flying capacitors Cph1 and Cph2, as shown in FIG. 13. The multi-level pulse driving system 100 in the present embodiment needs to realize not only the functions in the above embodiments but also controls on the voltages across the flying capacitors.

The local control module 120 in the present embodiment may further include an ADC chip 123 for monitoring the voltages across the flying capacitors. In some embodiments, the ADC chip 123 may also sample information such as voltages, currents, and temperatures, but the present disclosure is not limited to this. In the present embodiment, the voltage fluctuations of the flying capacitors are directly controlled based on the voltage information of the flying capacitors in combination with the modulation wave. As compared with conventional technologies, communication delay is reduced, and good control effect on the voltages across the flying capacitors can be achieved.

Referring to FIG. 13, taking a five-level converter as an example, the five-level converter includes power switches $S_1 \sim S_8$ and a flying capacitor unit which includes a first flying capacitor Cph1 and a second flying capacitor Cph2. The first flying capacitor Cph1 and the second flying capacitor Cph2 are connected in series and then bridge input terminals of the five-level converter 200. When switching elements in the five-level NPC converter including flying capacitors perform switching actions, the output voltage V0 with respect to the middle point of the bus capacitors has five levels: +V, +½V, 0, −½V, and −V. When the output voltage V0 is +½V, the on and off of the switches $S_1 \sim S_8$ will influence the voltage across the first flying capacitor Cph1. When V0 is −½V, the on and off of the switches $S_1 \sim S_8$ will influence the voltage across the second flying capacitor Cph2. For example, when the output voltage V0 with respect to the middle point 0 of bus capacitors is +½V, and the output current flows from the converter to the load. If the power elements $S_1$, $S_5$, $S_6$ and $S_7$ are turned on, the load current flows through the positive port of Cph1 to the negative port to charge Cph1, and thus the voltage across Cph1 goes up. If the power elements $S_2$, $S_5$, $S_7$ and $S_8$ are turned on, the load current flows through the negative port of Cph1 to the positive port to discharge Cph1, and then the voltage across Cph1 goes down. Thus, in order to ensure stability of the voltages across the flying capacitors, it is necessary to properly turn on or off $S_1 \sim S_8$ when V0 is +½V or −½V.

The pulse driving system in the present embodiment may further include three sampling resistors R1, R2 and R3 which are coupled to a positive terminal of the first flying capacitor Cph1, a middle connection point of the first and second flying capacitors Cph1 and Cph2, and a negative terminal of the second flying capacitor, respectively, so as to detect the voltages across the first and second flying capacitors Cph1 and Cph2. The local control chip FPGA monitors the voltage information of the flying capacitors, and when V0 with respect to the middle point 0 of bus capacitors is +½V or −½V, compares the modulation wave information sent from the main control module and the triangular wave in the local control chip FPGA to generate the time point at which V0 changes. Taking the first flying capacitor as an example, if the local control chip FPGA determines that the voltage across the first flying capacitor Cph1 is lower than +½V, a set of "PWM pulse signals 1(a)" are generated to turn on the power units S1, S5, S6 and S7 and to charge the first flying capacitor Cph1 when the output current flows from the converter to the load. If the local control chip FPGA determines that the voltage across the first flying capacitor Cph1 is higher than +½V, a set of "PWM pulse signals 1(b)" are generated to turn on the power units S2, S5, S7 and S8 and to discharge the first flying capacitor Cph1 when the output current flows from the converter to the load.

Because the sampling on the voltages of the flying capacitors are directly transmitted to the local control module, communication delay is reduced, and some special processes can be performed, which is helpful for voltage-balancing of the flying capacitors, and consequently, the capacity of the flying capacitors can be reduced, and thereby size and costs of the flying capacitors can be reduced.

Figure 14:
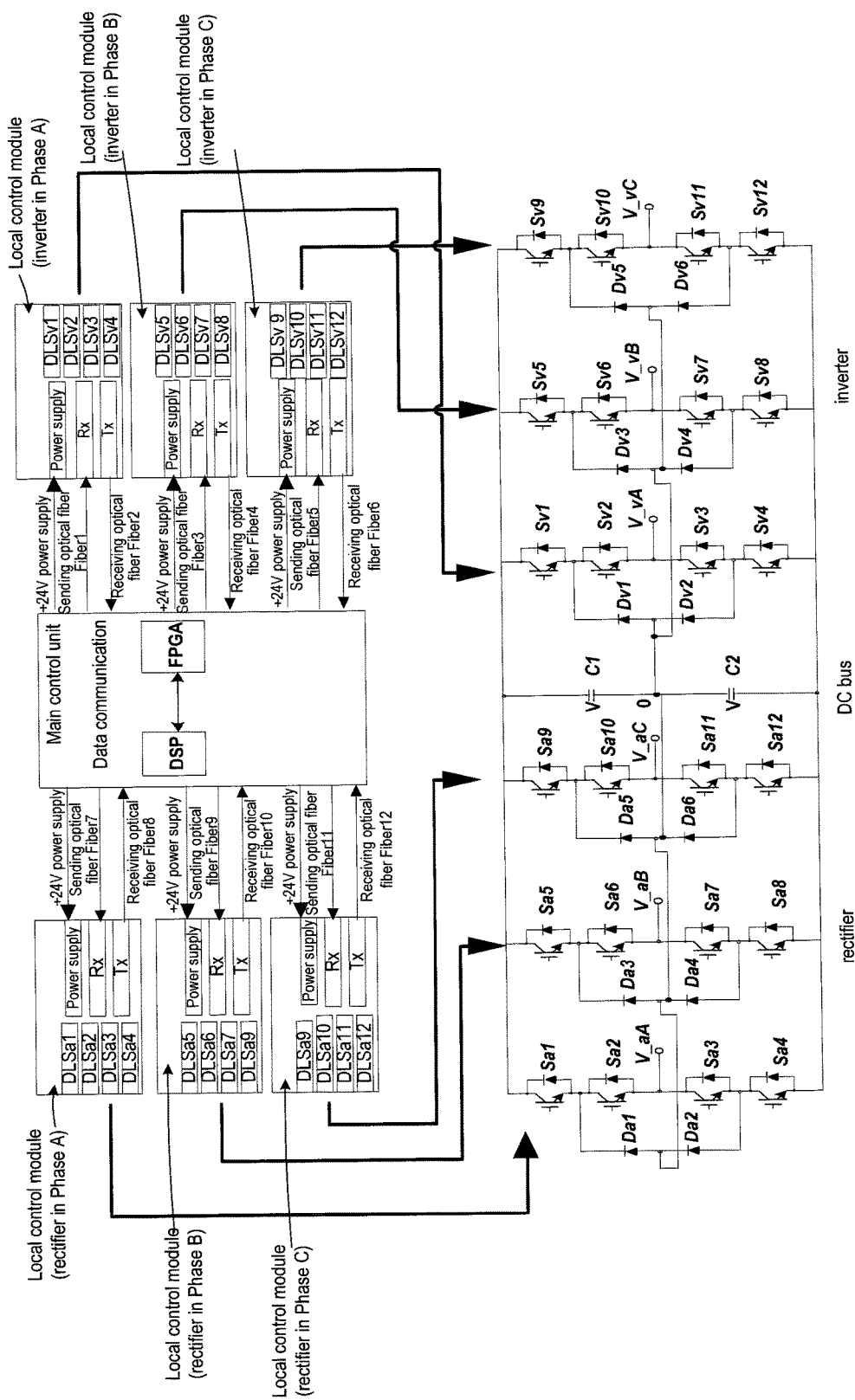
FIG. 14 is a schematic diagram showing a structure of a pulse driving system applied in an AC-DC-AC (rectifier+DC bus+inverter) converter according to an embodiment of the present disclosure.

An embodiment of the present disclosure provides a pulse driving system which may be applied in an AC-DC-AC (rectifier+DC bus+inverter) converter, the structure of which is shown in FIG. 14. The reference signs DLSa1~DLSa12 represent the driving lines for Sa1~Sa12, Rx and Tx represent optical fiber heads, and DLSv1~DLSv12 represent the driving lines for Sv1~Sv12.

Referring to FIG. 14, the system includes one main control module and two local control modules. The two local control modules communicate with the main control module via optical fibers, one of the local control modules is a local control module for driving the rectifier, and the other one is a local control module for driving the inverter. As shown in FIG. 14, the two local control modules are designed for three-phase multi-level converters, and thus they communicate with the main control module via six optical fibers to realize respective functions. It shall be noted that the rectifier and inverter topology in middle voltage frequency converter is not limited to the three-level NPC structure, but also may be a three-level flying capacitor clamped structure, or a five-level flying capacitor clamped structure. The structures and principles regarding the flying capacitors as mentioned above also apply in the embodiment.

Figure 15:
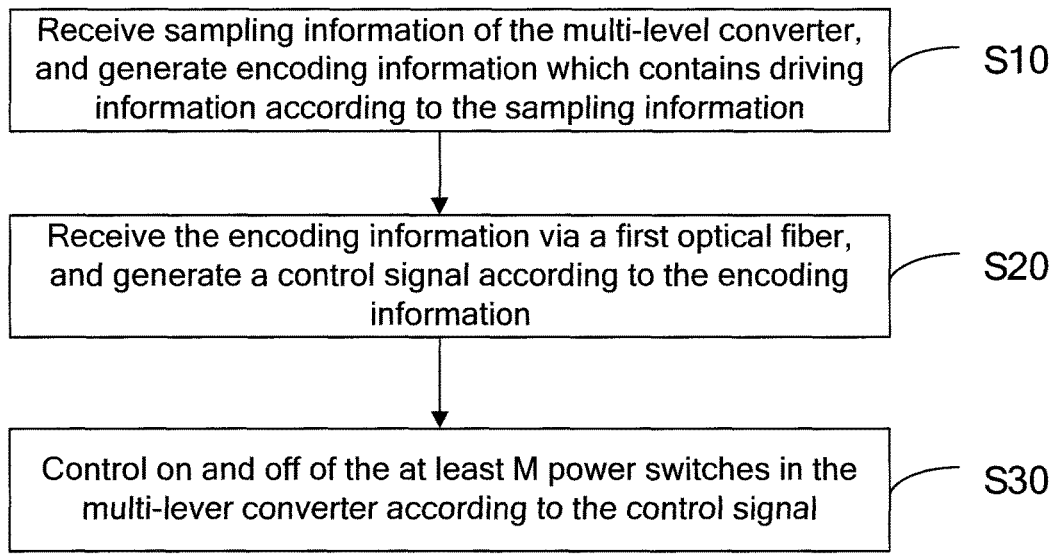
FIG. 15 is a flowchart showing a pulse driving method according to an embodiment of the present disclosure.

An embodiment of the present disclosure provides a pulse driving method for driving the multi-level converters as discussed in the above embodiments. The multi-level converter includes at least M power switches, where M≥2. The pulse driving method is as shown in FIG. 15, and may include the following steps.

In step S10, sampling information of the multi-level converter is received, and encoding information which contains driving information is generated according to the sampling information.

In step S20, the encoding information is received via a first optical fiber, and a control signal is generated according to the encoding information.

In step S30, on and off of the at least M power switches in the multi-lever converter are controlled according to the control signal.

The driving information may be a pulse signal, or a modulation signal.

When the driving information is a modulation signal, the receiving the encoding information via the first optical fiber in step S20 may further includes:

receiving a first synchronization signal via the first optical fiber, and performing adjustments according to the first synchronization signal to keep a phase of a first triangular wave signal consistent with a phase of a second triangular wave signal, wherein the first triangular wave signal is generated by a local control module, and the second triangular wave signal is generated by a main control module.

The generating the encoding information according to the sampling information in step S10 may further include:

processing the sampling information according to a control algorithm to obtain the driving information; and encoding the driving information to obtain the encoding information.

In the embodiment, the driving information is encoded using Manchester encoding to obtain the encoding information.

The generating the control signal according to the encoding information in step S20 further includes: performing data processing on the encoding information to obtain a pulse signal; and outputting the control signal according to the pulse signal.

When the driving information is a modulation signal, the pulse driving method further includes:

decoding the encoding information to obtain the modulation signal; and outputting the pulse signal by comparing the modulation signal and the first triangular wave signal.

Figure 16:
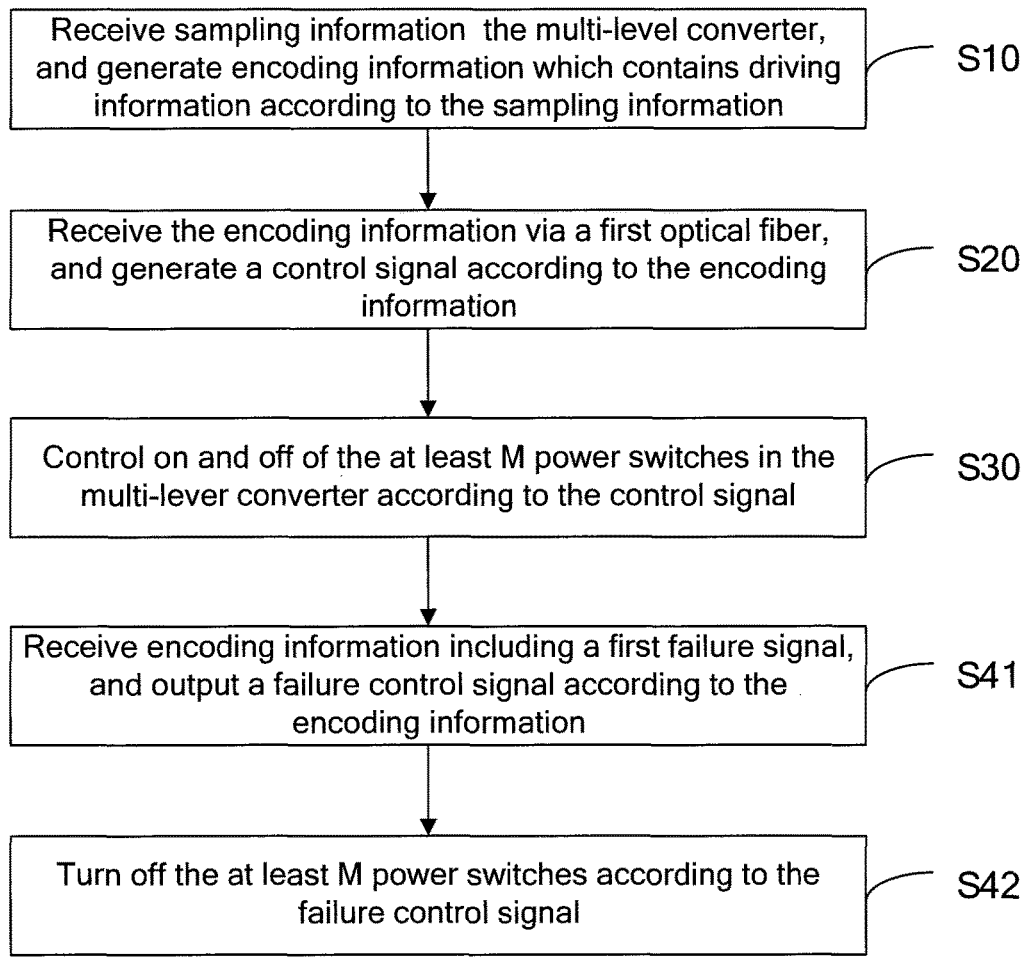
FIG. 16 is a flowchart showing another pulse driving method according to an embodiment of the present disclosure.

If a failure occurs in the system, the flowchart of the pulse driving method may be as shown in FIG. 16. In addition to steps S10~S30, the method may further include the following steps.

In step S41, if the main control module has a failure, the driving information is set as a first failure signal, the encoding information which contains the first failure signal is received, and a failure control signal is output according to the encoding information.

In step S42, the at least M power switches are turned off according to the failure control signal.

Figure 17:
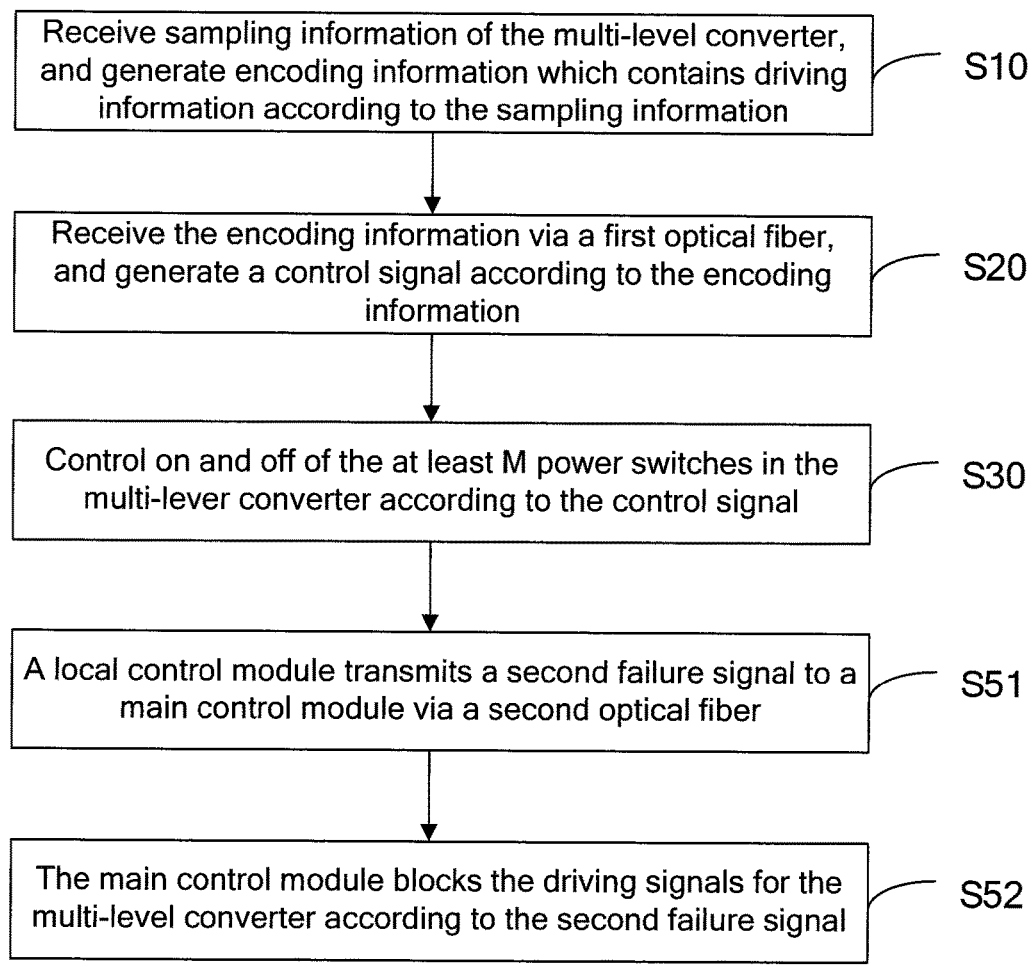
FIG. 17 is a flowchart showing another pulse driving method according to an embodiment of the present disclosure.

If the failure occurs at the multi-level converter side, the flowchart of the pulse driving method may be as shown in FIG. 17. In addition to steps S10~S30, the method may further include the following steps.

In step 51, if the multi-level converter has a failure, the local control module transmits a second failure signal to a main control module via a second optical fiber.

In step S52, the main control module blocks the driving signal for the multi-level converter according to the second failure signal.

The method provided by the embodiment of the present disclosure can achieve the same technical effects as the above discussed embodiments and repeated descriptions are omitted here.

Figure 18:
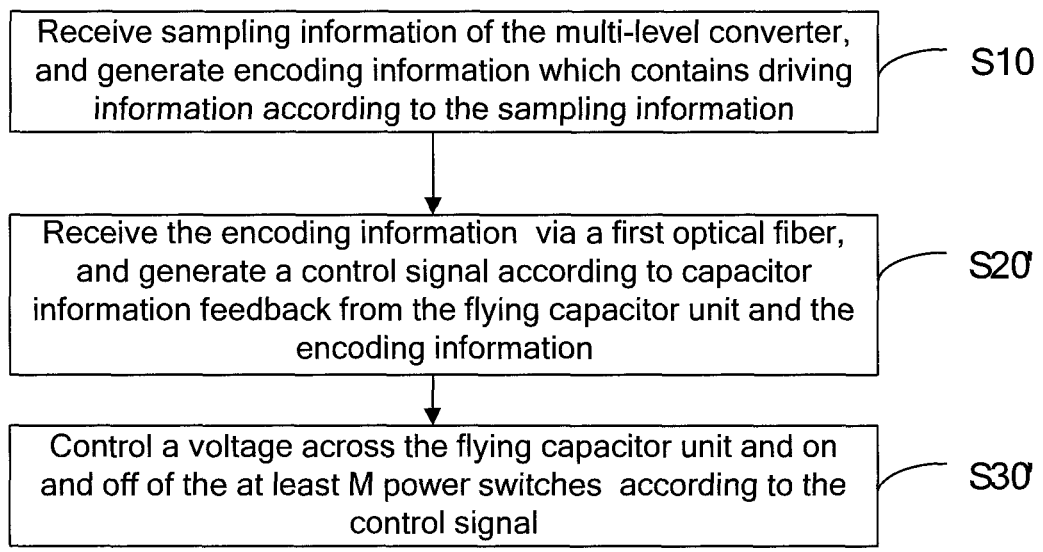
FIG. 18 is a flowchart showing a pulse driving method for driving a flying-capacitor-based multi-level converter according to an embodiment of the present disclosure.

An embodiment of the present disclosure provides a pulse driving method for driving the multi-level converters as discussed in the above embodiments. The multi-level converter includes at least M power switches, where M≥2. The multi-level converter may further include a flying capacitor unit, and accordingly the flowchart of the pulse driving method is as shown in FIG. 18. Step 10 is the same as the above discussed embodiment, and other steps are as follows.

In step S20', encoding information is received via a first optical fiber, and a control signal is generated according to capacitor information feedback from the flying capacitor unit and the encoding information.

In step S30', a voltage across the flying capacitor unit and on and off of the at least M power switches are controlled according to the control signal, wherein the capacitor information is a voltage value of a capacitor in the flying capacitor unit.

If an output voltage and an output current of the multi-level converter influences a first flying capacitor or a second flying capacitor in the flying capacitor unit to have voltage fluctuations, (for example, if a neutral point output voltage of the multi-level converter with respect to a level at a bus capacitor middle point influences a first flying capacitor or a second flying capacitor in the flying capacitor unit to have voltage fluctuations), at least two control signals are generated according to the encoding information, and one of the at least two control signals is selected according to the capacitor information to control on and off of the at least M power switches.

Similarly to the above discussed embodiment, if a failure occurs in the system, steps S41~S42 or S51~S52 may be further included after step S10, S20' or S30'.

The method provided by the embodiment of the present disclosure can achieve the same technical effects as the above discussed embodiments and repeated descriptions are omitted here.

Although the present disclosure has been described with reference to exemplary embodiments, various modifications and changes may be made on the embodiments of the present disclosure without departing from the scope and spirit of the present disclosure. Thus, it shall be appreciated that the present disclosure is not limited to the embodiments set forth herein, the protection scope of the present disclosure shall be defined by the appended claims and equivalents thereof.

What is claimed is:

1. A pulse driving system for driving a multi-level converter which comprises at least M power switches, where M≥2, wherein the pulse driving system comprises:
    a main control module generating encoding information which contains driving information according to sampling information;
    a local control module electrically coupled to the multi-level converter to output control signals to the multi-level converter so as to control on and off of the at least M power switches in the multi-level converter; and
    a first optical fiber coupled to the main control module and the local control module, wherein the local control module receives the encoding information output from the main control module via the first optical fiber and generates the control signals according to the encoding information;
    wherein the main control module comprises:
    a data processing unit receiving the sampling information of the multi-level converter and outputting the driving information by a control algorithm;
    a first control unit electrically coupled with the data processing unit to receive and encode the driving information and output the encoding information.

2. The pulse driving system according to claim 1, wherein the driving information is a pulse signal.

3. The pulse driving system according to claim 1, wherein the driving information is a modulation signal, the encoding information further contains a first synchronization signal, the local control module receives the first synchronization signal and performs adjustments according to the first synchronization signal to keep a phase of a first triangular wave signal in the local control module consistent with a phase of a second triangular wave signal in the main control module.

4. The pulse driving system according to claim 1, wherein the driving information is a modulation signal, the data processing unit is further configured to send a second synchronization signal to the first control unit, and perform adjustments according to the second synchronization signal to keep a phase of a second triangular wave signal in the first control unit consistent with a phase of a third triangular wave signal in the data processing unit.

5. The pulse driving system according to claim 1, wherein the main control module outputs the driving information according to the sampling information, and the first control unit performs Manchester encoding on the driving information to generate the encoding information.

6. The pulse driving system according to claim 1, wherein the local control module comprises:
    a second control unit receiving the encoding information which contains the driving information and performing data processing on the encoding information to obtain a pulse signal;
    an isolation and driving unit electrically coupled to the second control unit to receive the pulse signal and output the control signal according to the pulse signal.

7. The pulse driving system according to claim 6, wherein the isolation and driving unit comprises M isolation drivers which corresponds to the power switches one to one, each of the M isolation drivers has a primary side electrically coupled to the second control unit and a secondary side electrically coupled to a control terminal of a corresponding power switch.

8. The pulse driving system according to claim 6, wherein the driving information is a modulation signal;
    the second control unit further comprises:
    a decoding unit decoding the encoding information to output the modulation signal; and
    a pulse generation unit electrically coupled to the decoding unit to receive the modulation signal and output the pulse signal by comparing the modulation signal and a first triangular wave signal in the second control unit.

9. The pulse driving system according to claim 1, wherein if the main control module has a failure, the driving information is a first failure signal, the local control module outputs a failure control signal according to the encoding information which contains the first failure signal, wherein the failure control signal is configured to turn off all the power switches.

10. The pulse driving system according to claim 1, wherein if the multi-level converter has a failure, the control signal output from the local control module is a failure control signal which is configured to turn off all the power switches.

11. The pulse driving system according to claim 1, further comprising:
    a second optical fiber coupled to the main control module and the local control module so that if the multi-level converter has a failure, the local control module transmits a second failure signal to the main control module which blocks the control signal in the multi-level converter according to the second failure signal.

12. The pulse driving system according to claim 1, wherein the multi-level converter further comprises:
    a flying capacitor unit electrically coupled to the local control module;
    wherein the local control module further receives capacitor information of the flying capacitor unit and generates the control signal according to the capacitor information and the encoding information;

wherein the multi-level converter receives the control signal which contains the capacitor information and the encoding information to control a voltage across the flying capacitor unit and on and off of the at least M power switches.

13. The pulse driving system according to claim 12, wherein if an output voltage or an output current of the multi-level converter influences a first flying capacitor or a second flying capacitor in the flying capacitor unit to have voltage fluctuations, the local control module generates at least two control signals according to the encoding information, and selects one of the at least two control signals according to the capacitor information to control on and off of the at least M power switches.

14. A pulse driving method for driving a multi-level converter which comprises at least M power switches, where M≥2, wherein the method comprises:

receiving sampling information of the multi-level converter, and generating encoding information which contains driving information according to the sampling information;

receiving the encoding information via a first optical fiber, and generating a control signal according to the encoding information; and controlling on and off of the at least M power switches in the multi-lever converter according to the control signal;

wherein the generating the encoding information according to the sampling information further comprises:

processing the sampling information according to a control algorithm to obtain the driving information; and encoding the driving information to obtain the encoding information.

15. The pulse driving method according to claim 14, wherein the driving information is a pulse signal.

16. The pulse driving method according to claim 14, wherein the driving information is a modulation signal;

wherein the receiving the encoding information via the first optical fiber further comprises:

receiving a first synchronization signal via the first optical fiber, and performing adjustments according to the first synchronization signal to keep a phase of a first triangular wave signal consistent with a phase of a second triangular wave signal, wherein the first triangular wave signal is generated by a local control module, and the second triangular wave signal is generated by a main control module.

17. The pulse driving method according to claim 14, wherein the driving information is encoded using Manchester encoding to obtain the encoding information.

18. The pulse driving method according to claim 14, wherein the generating the control signal according to the encoding information further comprises:

performing data processing on the encoding information to obtain a pulse signal; and outputting the control signal according to the pulse signal.

19. The pulse driving method according to claim 16, wherein when the driving information is a modulation signal, the method further comprises:

decoding the encoding information to obtain the modulation signal; and outputting the pulse signal by comparing the modulation signal and the first triangular wave signal.

20. The pulse driving method according to claim 14, further comprising:

if the main control module has a failure, setting the driving information as a first failure signal;

receiving the encoding information which contains the first failure signal, and outputting a failure control signal according to the encoding information; and turning off all the power switches according to the failure control signal.

21. The pulse driving method according to claim 14, further comprising:

if the multi-level converter has a failure, transmitting, by a local control module, a second failure signal to a main control module via a second optical fiber; and blocking, by the main control module, the driving signal for the multi-level converter according to the second failure signal.

22. The pulse driving method according to claim 14, wherein the multi-level converter further comprises a flying capacitor unit;

wherein the method further comprises:

generating the control signal according to capacitor information and the encoding information, and controlling a voltage across the flying capacitor unit and on and off of the at least M power switches according to the control signal, wherein the capacitor information is a voltage value of a capacitor in the flying capacitor unit.

23. The pulse driving method according to claim 22, further comprising:

if an output voltage and an output current of the multi-level converter influences a first flying capacitor or a second flying capacitor in the flying capacitor unit to have voltage fluctuations, generating at least two control signals according to the encoding information, and selecting one of the at least two control signals according to the capacitor information to control on and off of the at least M power switches.

* * * * *